US010526785B2

(12) United States Patent
Murphey

(10) Patent No.: US 10,526,785 B2
(45) Date of Patent: Jan. 7, 2020

(54) DEFORMABLE STRUCTURES

(71) Applicant: Opterus Research and Development, Inc., Fort Collins, CO (US)

(72) Inventor: Thomas W. Murphey, Fort Collins, CO (US)

(73) Assignee: Opterus Research and Development, Inc., Fort Collins, CO (US)

( * ) Notice: Subject to any disclaimer, the term of this patent is extended or adjusted under 35 U.S.C. 154(b) by 0 days.

(21) Appl. No.: 15/959,815

(22) Filed: Apr. 23, 2018

(65) Prior Publication Data

US 2018/0313083 A1 Nov. 1, 2018

Related U.S. Application Data

(60) Provisional application No. 62/490,289, filed on Apr. 26, 2017.

(51) Int. Cl.
*E04C 3/00* (2006.01)
*E05D 1/00* (2006.01)
(Continued)

(52) U.S. Cl.
CPC ................ *E04C 3/005* (2013.01); *E04C 3/07* (2013.01); *E04C 3/28* (2013.01); *E05D 1/00* (2013.01)

(58) Field of Classification Search
CPC .... E04C 3/005; E04C 3/07; E04C 2003/0473; E04C 2003/0434; E04C 3/28; E04C 2003/0413; E05D 1/00; E04H 12/18
See application file for complete search history.

(56) References Cited

U.S. PATENT DOCUMENTS 3,434,254 A * 3/1969 Rubin ...................... B64G 9/00 138/119
3,528,543 A * 9/1970 Robinsky ............... B65D 81/03 428/178

(Continued)

FOREIGN PATENT DOCUMENTS

WO WO-1997035706 A1 10/1997

OTHER PUBLICATIONS

Leipold, M., et al., "Large Sar Membrane Antennas With Lightweight Deployable Booms", 2005, 28th ESA Antenna Workshop on Space Antenna Systems and Technologies, ESA/ESTEC (8 pgs.).

(Continued)

*Primary Examiner* — Beth A Stephan
(74) *Attorney, Agent, or Firm* — Harris Beach PLLC

(57) ABSTRACT

A deformable device has an extended state, a flattened state, and a rolled state if a beam, where a stiffness and strength of the deformable beam or hinge in the extended state is greater than a different stiffness and strength of the deformable beam or hinge in the flattened state. An end face cross section includes a main C curved member which defines an about circular shape of an arc ranging between about a quarter arc and a substantially full circle. A periodic C curved member defines at least two about C shaped curves. The periodic C curved member has a first periodic C curved member end mechanically coupled to the first main C curved member end, and a second periodic C curved member end mechanically coupled to the second main C curved member end. A deformable device with a V shaped member is also described.

20 Claims, 29 Drawing Sheets

Flattened

(51) Int. Cl.
*E04C 3/28* (2006.01)
*E04C 3/07* (2006.01)

(56) References Cited

U.S. PATENT DOCUMENTS

| | | | | |
|---|---|---|---|---|
| 3,696,568 | A * | 10/1972 | Berry | E04C 3/005 52/108 |
| 3,811,633 | A * | 5/1974 | Cummings | B29C 53/20 226/172 |
| 4,047,339 | A * | 9/1977 | Smith | E04C 3/005 52/108 |
| 4,818,055 | A | 4/1989 | Patterson | |
| 5,154,965 | A | 10/1992 | Rouhling | |
| 5,238,728 | A | 8/1993 | Aucagne | |
| 6,217,975 | B1 * | 4/2001 | Daton-Lovett | B29C 61/0608 156/161 |
| 6,256,938 | B1 * | 7/2001 | Daton-Lovett | F16H 19/064 138/119 |
| 7,354,033 | B1 | 4/2008 | Murphey et al. | |
| 7,617,639 | B1 | 11/2009 | Pollard et al. | |
| 7,895,795 | B1 | 3/2011 | Murphey et al. | |
| 8,434,196 | B1 | 5/2013 | Murphey et al. | |
| 9,863,148 | B2 * | 1/2018 | Fernandez | E04C 3/005 |
| 2004/0197519 | A1 | 10/2004 | Elzey et al. | |
| 2010/0241165 | A1 | 9/2010 | Konieczynski et al. | |
| 2012/0065723 | A1 | 3/2012 | Drasler et al. | |
| 2013/0289707 | A1 | 10/2013 | Shanley et al. | |
| 2014/0180396 | A1 | 6/2014 | Pike et al. | |
| 2014/0230949 | A1 * | 8/2014 | Daton-Lovett | B64G 1/222 138/177 |

OTHER PUBLICATIONS

Fernandez, Juan M., "Advanced Depolyable Shell-Based Composite Booms for Small Satellite Structural Applications Including Solar Sails", ResearchGate, Mar. 20, 2017 (pp. 1-19).

Rehnmark, Fredrik, et al., "Development of a Deployable Nonmetallic Boom for Reconfigurable Systems of Small Spacecraft", 48th AIAA/ASME/ASCE/AHS/ASC Structures, Structural Dynamics, and Materials Conference, Apr. 23-26 (pp. 1-19).

Jeong, J.W., et al., "A Novel Tape Spring Hinge Mechanism for Quasi-Static Deployment of a Satellite Deployable Using Shape Memory Alloy," Feb. 2014, The Review of Scientific Instruments (12 pgs.).

Pini, V., et al., "How two-dimensional bending can extraordinarily stiffen thin sheets," Jul. 2016, Scientific Reports (pp. 1-16).

ISA/US, International Search Report and Written Opinion for Corresponding International Application No. PCT/US18/29348, dated Jul. 27, 2018 (13 pgs).

* cited by examiner

Index of Basic Cross Section Classes

DubC Boom

DubC Hinge

Cross Section

Isometric View

Flattened

Rolled

MidC

Cross Section

Isometric View

Flattened

Rolled

TriC Hinge 501
508
507
511
513
517
519
509
Cross Section

Isometric View

Flattened

Rolled

TriC Flat Boom

Z Boom

Z Hinge

Cross Section

Isometric View

Flattened

Rolled

More C Boom Sections

Even More C Boom Sections

DubC Laminate Thickness Variation

DubC Fiber Orientation

TriC Fiber Orientation

Z Boom Laminate Thickness Variation

Near Full Circle Cross Section

DEFORMABLE STRUCTURES

CROSS-REFERENCE TO RELATED APPLICATIONS

This application claims priority to and the benefit of U.S. provisional patent application Ser. No. 62/490,289, DEFORMABLE STRUCTURES, filed Apr. 26, 2017, which application is incorporated herein by reference in its entirety.

FIELD OF THE APPLICATION

The application relates to deformable structures and particularly to deformable beams and deformable hinges.

BACKGROUND

Deformable structures are structures that can dramatically change shape.

SUMMARY

According to one aspect, a deformable device includes a deformable beam or hinge having an extended state, a flattened state, and a rolled state if a beam, where a stiffness and strength of the deformable beam or hinge in the extended state is greater than a different stiffness and strength of the deformable beam or hinge in the flattened state. An end face cross section of the deformable beam or hinge includes a main C curved member which defines an about circular shape of an arc ranging between about a quarter arc and a substantially full circle. The main C curved member has a first main C curved member end and a second main C curved member end. A periodic C curved member defines at least two about C shaped curves. The periodic C curved member has a first periodic C curved member end mechanically coupled to the first main C curved member end, and a second periodic C curved member end mechanically coupled to the second main C curved member end.

In one embodiment, at least one of the first periodic C curved member end is joined to the first main C curved member end inside of the main C curved member or the second main C curved member end is joined to the second periodic C curved member end inside of the main C curved member.

In another embodiment, the main C curved member and the periodic C curved member include about a same arc length.

In yet another embodiment, the deformable beam or hinge includes a TriC structure.

In yet another embodiment, the periodic C curved member includes about two and a half cycles of alternating C shapes.

In yet another embodiment, the periodic C curved member includes about two and a half cycles of an about sinusoidal shaped curve.

In yet another embodiment, at least one of the main C curved member or the periodic C curved member include an additional different shape.

In yet another embodiment, the additional different shape includes a substantially straight line.

In yet another embodiment, the periodic C curved member includes at least one C shape larger than either of two smaller C shapes on either end of the at least one C shape.

In yet another embodiment, at least one C shape larger than either of two smaller C shapes follows a path about parallel to the main C curved member.

In yet another embodiment, the main C curved member includes an arc length of up to about 350 degrees arc of a full circle.

In yet another embodiment, the deformable device includes a fibre structure selected from the group consisting of [B], [B/UD/B], [UD/B/UD], and any combination thereof.

In yet another embodiment, the main C curved member includes a [B/UD@0/B] fibre structure.

In yet another embodiment, the main C curved member includes a [B/UD@0] or a [B] fibre structure.

In yet another embodiment, at least one member of said deformable device comprises at least one cut out along a length of said member.

In yet another embodiment, the main C curved member includes a different thickness relative to the periodic C curved member.

In yet another embodiment, at least one member of the main C curved member or the periodic C curved member includes a variation in thickness across the at least one member.

In yet another embodiment, at least one joined section of an end of said main C curved member with an end of said periodic C curved member extends in a direction about outward from said main C curve member.

According to another aspect, a deformable device includes a deformable beam or hinge having an extended state, a flattened state, and a rolled state if a beam, where a stiffness and strength of the deformable beam or hinge in the extended state is greater than a different stiffness and strength of the deformable beam or hinge in the flattened state. An end face cross section of the deformable beam or hinge includes a first about V shaped member which is defined by a pair of first member arcs joined at a first end of each first member arc to form a first vertex. A second about V shaped member is defined by a pair of second member arcs joined at a first end of each second member arc to form a second vertex. A pair of substantially flat trailing sections are disposed on either side of an opposite end of each second member arc. An opposite end of each first member arc is joined to an end of each of the pair of substantially flat trailing sections.

In one embodiment, at least one of the pair of substantially flat trailing sections on either side of an opposite end of each second member arc continue past a joined section and curve towards a direction about perpendicular to an axis of the pair of substantially flat trailing sections.

In another embodiment, at least one of the pair of first member arcs continues past a joined section at the first vertex and curves outward towards a direction about parallel to an axis of the pair of substantially flat trailing sections.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Definitions

The phrase "end modification" as used herein, describes modifications of the physical end of a structure.

Axial stiffness refers to a stiffness along the structure long axis. In general, extended states are stiffer with respect to multiple axes (axes include torsion, two bending axes, two sheer, and axial).

Plurality—common meaning, more than one, or at least two.

Deformable structures can dramatically change shape. While all structures are deformable to some extent, structures of this Application, change shape so dramatically that the original form of the structure can be difficult to recognize in the deformed shape. The shape change is designed to allow the structure to meet one set of desired requirements in one shape, and another set of desired requirements in another shape. A common example of a prior art deformable structure is an elastic tape-spring hinge that allows a structure to fold and compactly package for mobility and subsequent unfolding and locking into a stiff and strong structure.

Applications requiring structures that can change shape are vast and include, for example, sun shades, airfoils, awnings, retractable roofs, deployable space structures, etc. The present invention relates to reconfigurable hinges and beams. They can form elements of more complex reconfigurable structures, such as a truss.

Structural members which can be flattened and rolled are described in detail hereinbelow. In lengths from about equal to the flattened width to 10 times the flattened width, the structural member can be used as a self-locking hinge (a deformable hinge). In lengths from about 4 times the flattened width to 1,000 times the flattened width, the structural member can be used as a furlable beam (a deformable beam). The furlable beam can be flattened in one or more directions, reducing the stiffness and strength of the member. The furlable beam can then be rolled to compactly package it.

A deformable beam having an extended state, a flattened state, and a rolled state. An axial stiffness of the deformable beam in the extended state is greater than an axial stiffness in the flattened state. A deformable hinge has two states including an extended state, and a folded state. An axial stiffness of the deformable hinge in the extended state is greater than an axial stiffness in the folded state.

New shapes of deformable structures, new deformable structures, and new applications for the deformable structures are described in this Application.

In some embodiments, the structural member is beam-like and has a longitudinal axis extending the length of the beam. In one exemplary embodiment, the beam cross section is primarily prismatic, primarily tapered, or any combination thereof.

Figure 1:
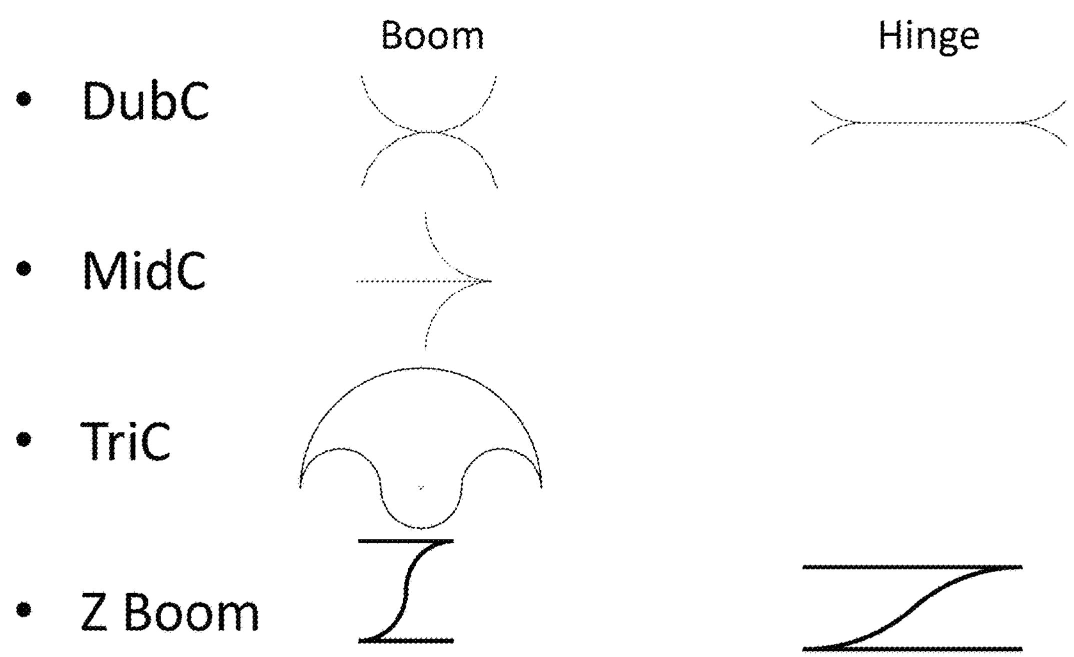
FIG. 1 shows a drawing showing basic end view cross section classes of exemplary deformable structures.

FIG. 1 shows a drawing showing exemplary basic end view cross section classes of a DubC Boom, a DubC Hinge, a MidC, TriC Boom, a TriC Hinge, a Z Boom, and a Z Hinge.

The DubC end face structure (cross section) includes two about circular members joined back to back at about a center portion of the two circular portions. Each of the two about circular members typically include between about a quarter about circle to about a half about circle shape. In other words, the curved portions are joined back to back at about a center portion of a curve.

The MidC end face (cross section) structure includes two curved members, each of the two curved members are joined at about the ends of the curves, and at the end of a substantially center substantially flat or straight member. In other words, the end face cross section structure includes a plurality of curved members having a curve end and an opposite curve end, each of the curve ends are joined together, and each of the opposite curved ends are non-joined tips.

The TriC end face (cross section) structure includes an about "C" shape as an about circular member ranging from about a quarter about circle to nearly or about a full circle joined to at both ends of the about circular portion to a curve member which extends between both ends of the about circular member. The curve which extends between both ends of the about circular member can include a desired curve shape with about two or more about "C" shapes. For example, the curve which extends between both ends of the about circular member can include an about sine curve shape (the "sine shape" to convey a sense of a repeating or periodic waveform, however, typically, more "C" shaped), such as including an about sine curve shape (e.g. successive "C" shapes of alternating orientation) of, for example, one and one-half cycles of a sine curve (e.g. from sine 0° to sine 540°). Each of the curved portions are joined at about a curve end.

TriC deformable structures, and C booms or hinges more generally, are one example of typically "closed" curves. In a closed curve deformable structure, the cross section or end view presents at least one continuous line which closes on itself. In order to properly transition to a flattened state or rolled state, curves which run substantially parallel to each other in the longitudinal direction (e.g. along a beam) should have the same arc length between joined curve ends. With substantially the same arc length between joined curve ends, when the deformable structure flattens, there should be substantially no wrinkles or distortion of the surfaces of either of the curved sections. If the arc lengths are significantly different, one or both of the structures will wrinkle or otherwise be damaged, probably irreversibly damaged, such as at the joints, when the structure is made flat.

In more detail, an end face cross section of the deformable beam TriC type deformable structure, includes a main C curved member 501 which defines an about circular shape of an arc ranging between about a quarter arc and a substantially full circle. The main C curved member has a first main C curved member end 511 and a second main C curved member end 513. A periodic C curved member 509 defines at least two about C shaped curves (507, 508). The periodic C curved member 509 has a first periodic C curved member end 517 mechanically coupled to the first main C curved member end 511, and a second periodic C curved member end 519 mechanically coupled to the second main C curved member end 513.

In typical embodiments, while parts of the periodic C curved member 509 can extend outside of the main C curved member 501, at least one of the first periodic C curved member end 517 is joined to the first main C curved member end 511 inside of the main C curved member 501 or the second main C curved member end 513 is joined to the second periodic C curved member end 519 inside of the main C curved member 501. In typical embodiments, the main C curved member 501 and the periodic C curved member 509 include about a same arc length. In some embodiments, the periodic C curved member includes about two and a half cycles of alternating C shapes (507, 508). In some embodiments, there can be more than two C shapes on the periodic C curved member 509. For example, the TriC type or TriC related structure of FIG. 10 periodic C curved member 509 includes C shaped members 1111, 1112, 1113, 1121, and 1121. In some embodiments, the periodic C curved member 509 includes about two and a half cycles of an about sinusoidal shaped curve.

In some embodiments, at least one of the main C curved member or the periodic C curved member include an additional different shape. For example, the additional different shape includes a substantially straight line.

In some embodiments, the periodic C curved member 509 includes at least one C shape 2751 which is larger in comparison to either of two smaller C shapes 507, 508 on either end of the at least one C shape. In some embodiments, at least one C shape 2751 larger than either of two smaller C shapes 507, 508 follows a path about parallel to the main C curved member. In some embodiments, the main C curved member 501 includes an arc length 501 of up to about 350 degrees arc of a full circle with periodic C curved member 509 within including at least one C shape 2753 larger than either of two smaller C shapes 507, 508 (FIG. 27C).

The Z Boom end face (cross section) structure includes two opposite substantially flat members joined from opposite sides by about an S curve member. The curve member is joined at both ends, here each curve end joined to a different flat member.

A deformable beam typically has three characteristic shapes that it can be deformed into.

In a first configuration, the deformable beam has substantial width and height in directions transverse to the longitudinal axis with an aspect ratio typically ranging from about 0.1 to 1. The width and height give the beam substantial bending stiffness and strength by providing substantial cross section moment of inertia. The configuration may also have substantial axial, shear and torsional stiffness and strength compared to the flattened state, the extended state typically has 10 to 10,000 times greater bending stiffness and strength, 10 to 1,000 times greater torsional stiffness and strength, and 10 to 10,000 greater axial strength.

In a second configuration, the deformable beam dimensions in one or more of the transverse directions are reduced to the material thickness which is typically 10 to 1000 times less than the extended transverse dimension. This reduction in transverse dimension reduces the stiffness and buckling strength of the deformable beam. The deformable beam cross section at the ends of the beam may flatten or remain un-deformed. The beam cross section near the ends of the beam can be modified (non prismatically to allow the transition from the beam end to a location within the beam such that stress concentrations and material failure are avoided. Example modifications are changes in material thickness, tapering the cross section, cutting away parts of the cross section, and adding material to the cross section.

In a third configuration, the shape of the second configuration is typically bent or rolled into the final alternate configuration of the structure. An elastic beam in bending should have surface tensile and compressive strains about equal to the ratio of the beam transverse direction perpendicular to the roll axis to the rolling diameter. Flattening the cross section reduces the material strain so that the material does not fail. The cross section dimension is typically reduced by 10 to 1000 so that the desired material strength is reduced by the same ratio.

Figure 2A:
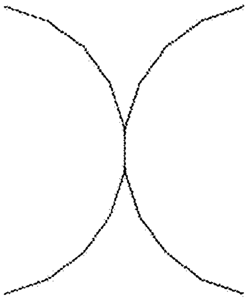
FIG. 2A shows a cross section view of a DubC Boom.
Figure 2B:
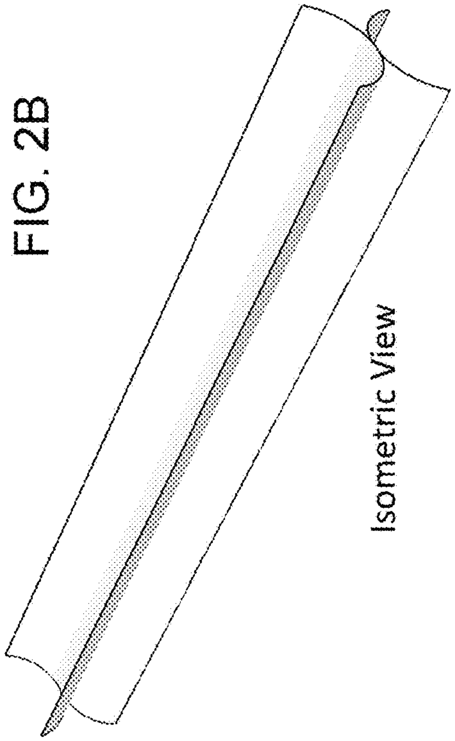
FIG. 2B shows an isometric view of an opened DubC Boom.
Figure 2C:
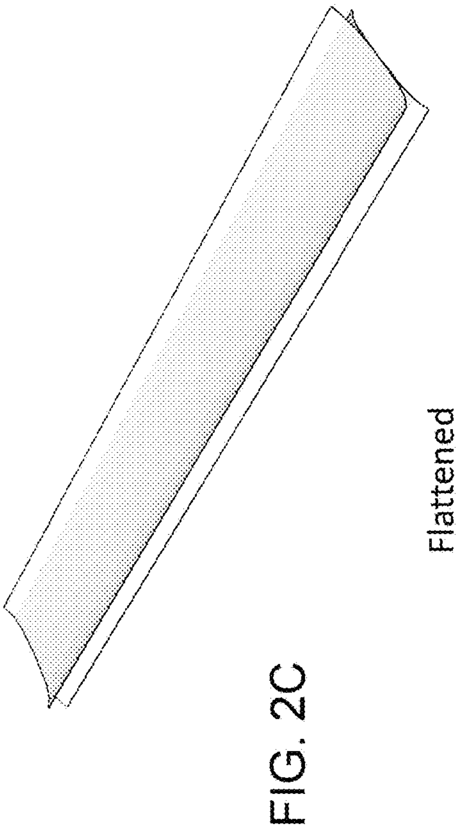
FIG. 2C shows an isometric view of a flattened DubC Boom.
Figure 2D:
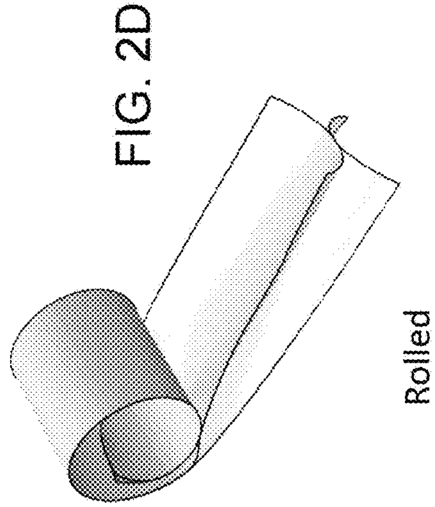
FIG. 2D shows an isometric view of a rolled DubC Boom.

FIG. 2A shows a cross section view of a DubC Boom. FIG. 2B shows an isometric view of an opened DubC Boom. FIG. 2C shows an isometric view of a nearly flattened DubC Boom. FIG. 2D shows an isometric view of a rolled DubC Boom.

Figure 3A:
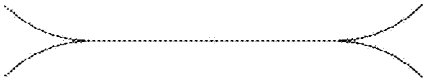
FIG. 3A shows a cross section view of a DubC Hinge.
Figure 3B:
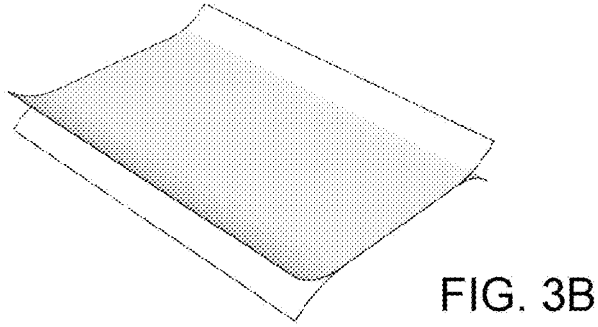
FIG. 3B shows an isometric view of an opened DubC Hinge.
Figure 3C:
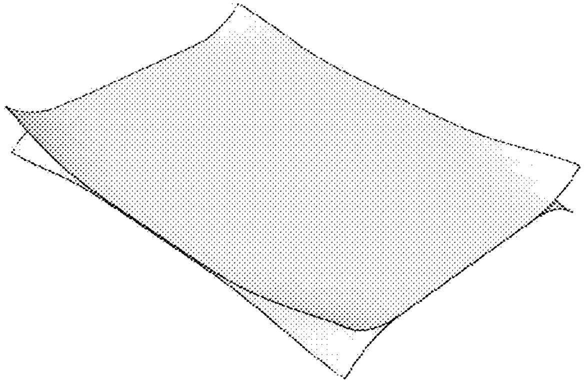
FIG. 3C shows an isometric view of a flattened DubC Hinge.
Figure 3D:
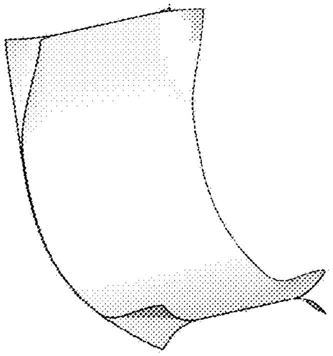
FIG. 3D shows an isometric view of a rolled DubC Hinge.

FIG. 3A shows a cross section view of a DubC Hinge. FIG. 3B shows an isometric view of an opened DubC Hinge. FIG. 3C shows an isometric view of a flattened DubC Hinge. FIG. 3D shows an isometric view of a rolled DubC Hinge.

Figures 4A, 4B, 4C, 4D:
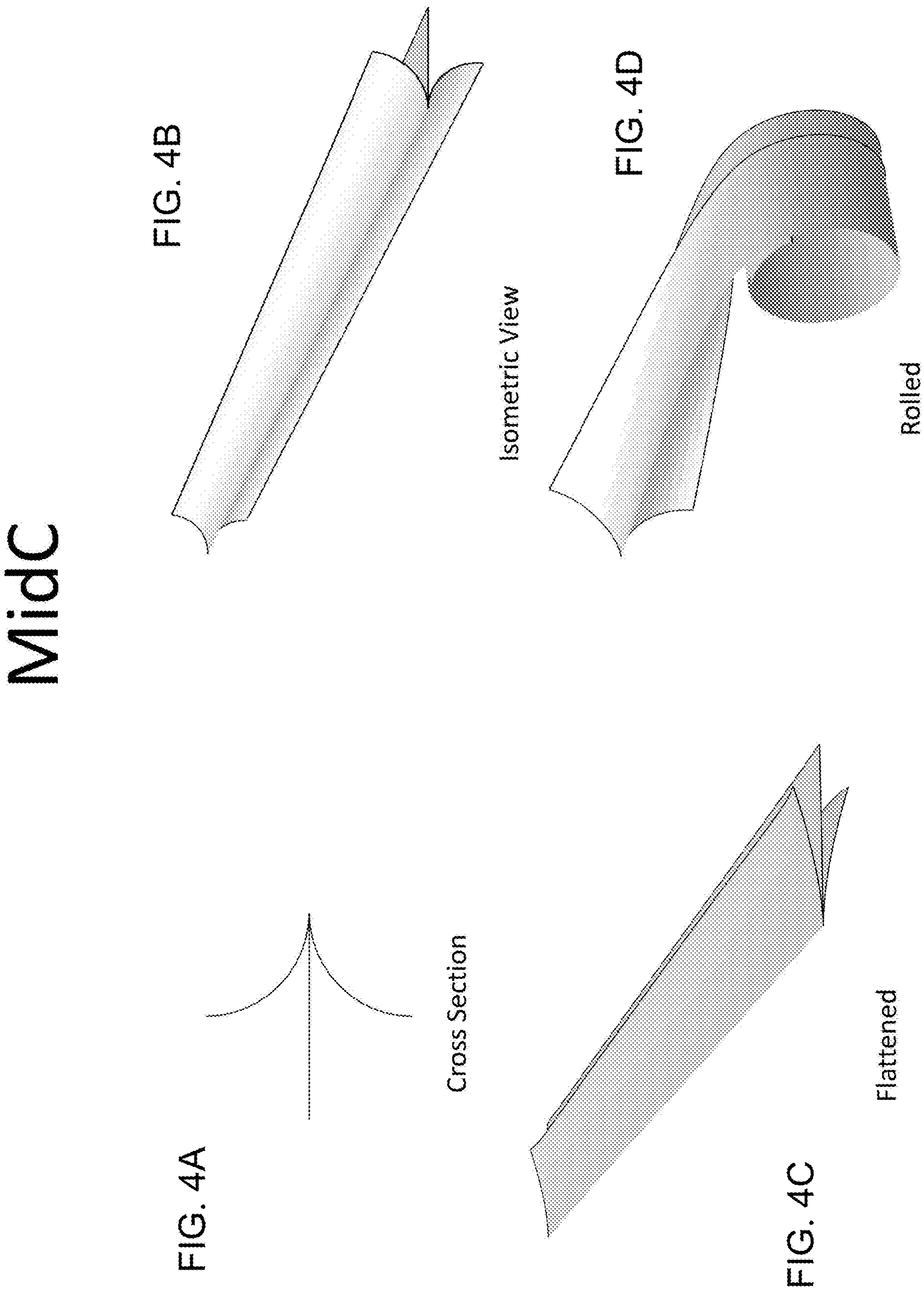
FIG. 4A shows a cross section view of a MidC Hinge.
FIG. 4B shows an isometric view of an opened MidC Hinge.
FIG. 4C shows an isometric view of a flattened MidC Hinge.
FIG. 4D shows an isometric view of a rolled MidC Hinge.

FIG. 4A shows a cross section view of a MidC Hinge or Beam. FIG. 4B shows an isometric view of an opened MidC Hinge. FIG. 4C shows an isometric view of a nearly flattened MidC Hinge. FIG. 4D shows an isometric view of a rolled MidC Hinge.

Figures 5A, 5B, 5C, 5D:
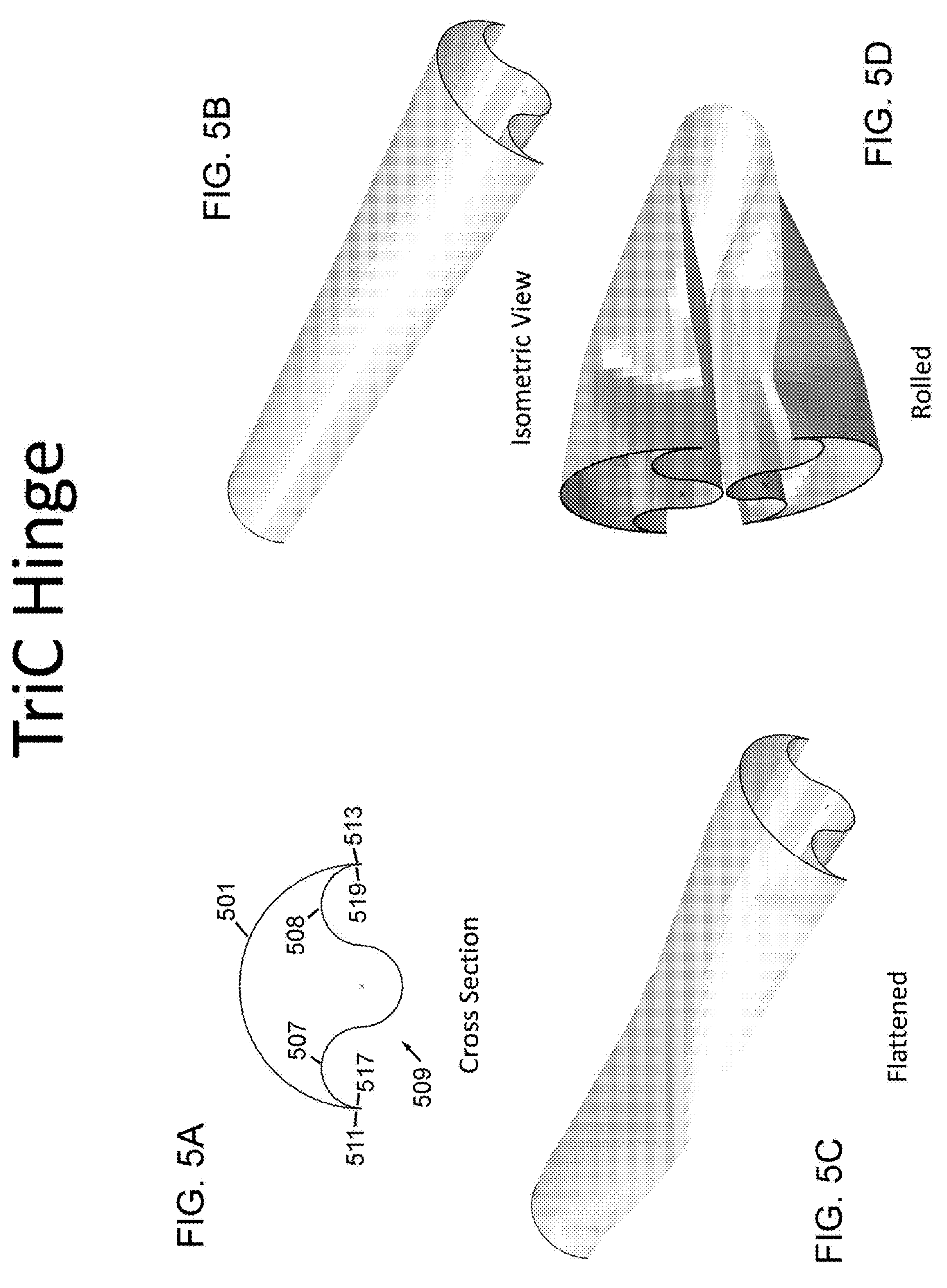
FIG. 5A shows a cross section view of a TriC Hinge.
FIG. 5B shows an isometric view of an opened TriC Hinge.
FIG. 5C shows an isometric view of a flattened TriC Hinge.
FIG. 5D shows an isometric view of a rolled TriC Hinge.

FIG. 5A shows a cross section view of a TriC Hinge. FIG. 5B shows an isometric view of an opened TriC Hinge. FIG. 5C shows an isometric view of a flattened TriC Hinge. FIG. 5D shows an isometric view of a rolled TriC Hinge.

Figures 6A, 6B, 6C, 6D:
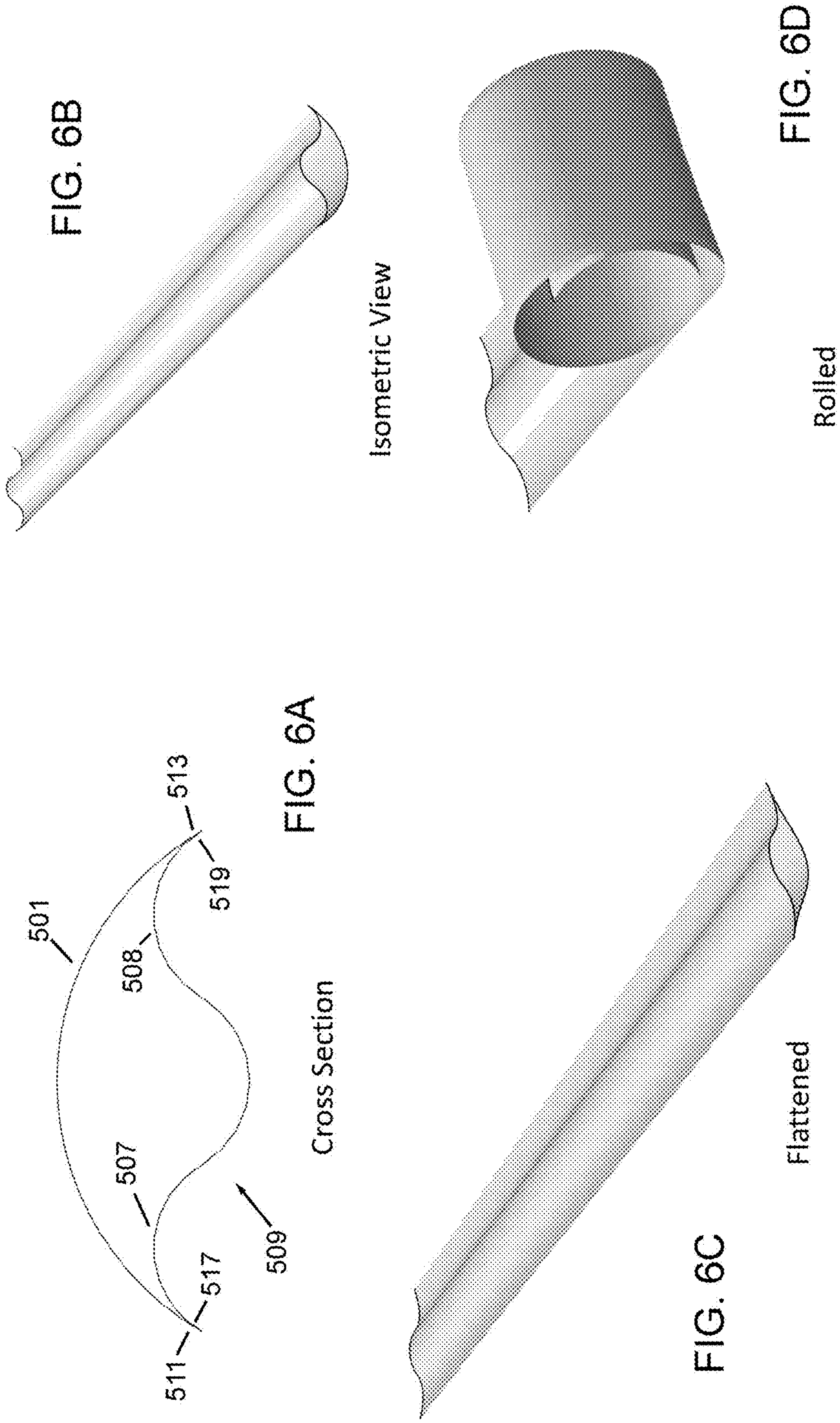
FIG. 6A shows a cross section view of a TriC Flat Boom.
FIG. 6B shows an isometric view of an opened TriC Flat Boom.
FIG. 6C shows an isometric view of a flattened TriC Flat Boom.
FIG. 6D shows an isometric view of a rolled TriC Flat Boom.

FIG. 6A shows a cross section view of a TriC Flat Boom. FIG. 6B shows an isometric view of an opened TriC Flat Boom. FIG. 6C shows an isometric view of a flattened TriC Flat Boom. FIG. 6D shows an isometric view of a rolled TriC Flat Boom.

Figures 7A, 7B, 7C, 7D:
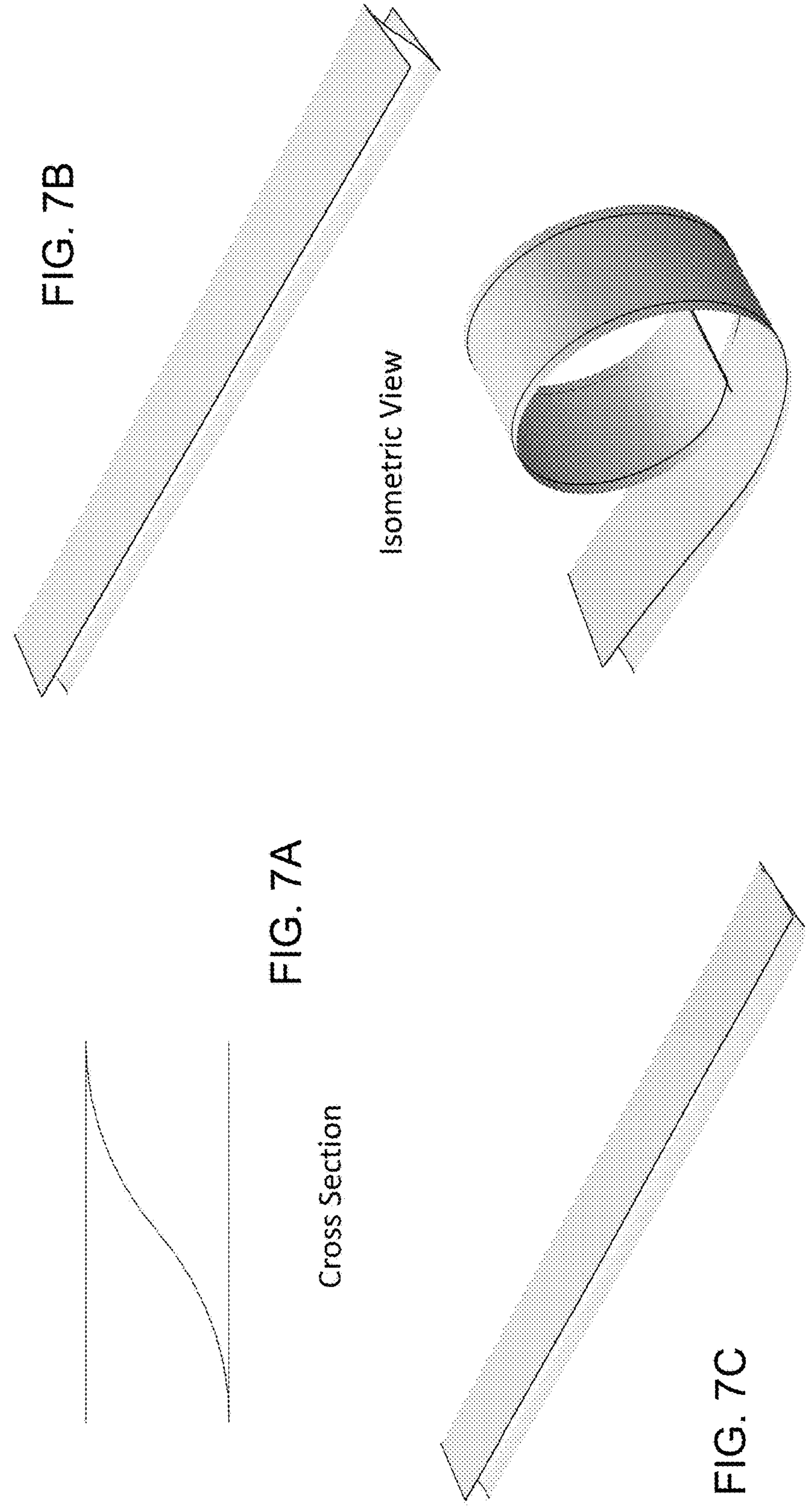
FIG. 7A shows a cross section view of a Z Boom.
FIG. 7B shows an isometric view of an opened Z Boom.
FIG. 7C shows an isometric view of a flattened Z Boom.
FIG. 7D shows an isometric view of a rolled Z Boom.

FIG. 7A shows a cross section view of a Z Boom. FIG. 7B shows an isometric view of an opened Z Boom. FIG. 7C shows an isometric view of a flattened Z Boom. FIG. 7D shows an isometric view of a rolled Z Boom.

Figures 8A, 8B, 8C, 8D:
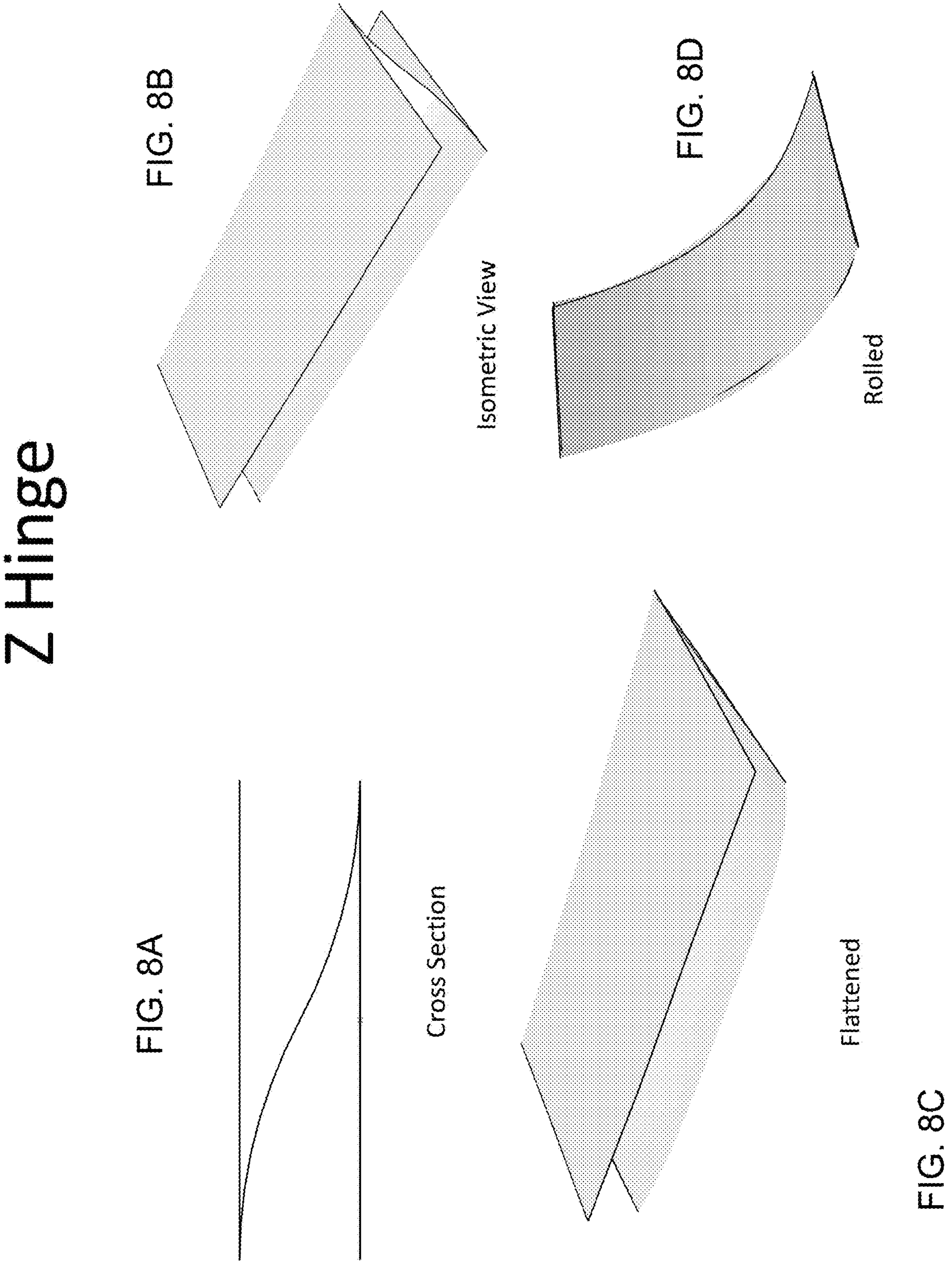
FIG. 8A shows a cross section view of a Z Hinge.
FIG. 8B shows an isometric view of an opened Z Hinge.
FIG. 8C shows an isometric view of a flattened Z Hinge.
FIG. 8D shows an isometric view of a rolled Z Hinge.

FIG. 8A shows a cross section view of a Z Hinge. FIG. 8B shows an isometric view of an opened Z Hinge. FIG. 8C shows an isometric view of a flattened Z Hinge. FIG. 8D shows an isometric view of a rolled Z Hinge.

Figure 9:
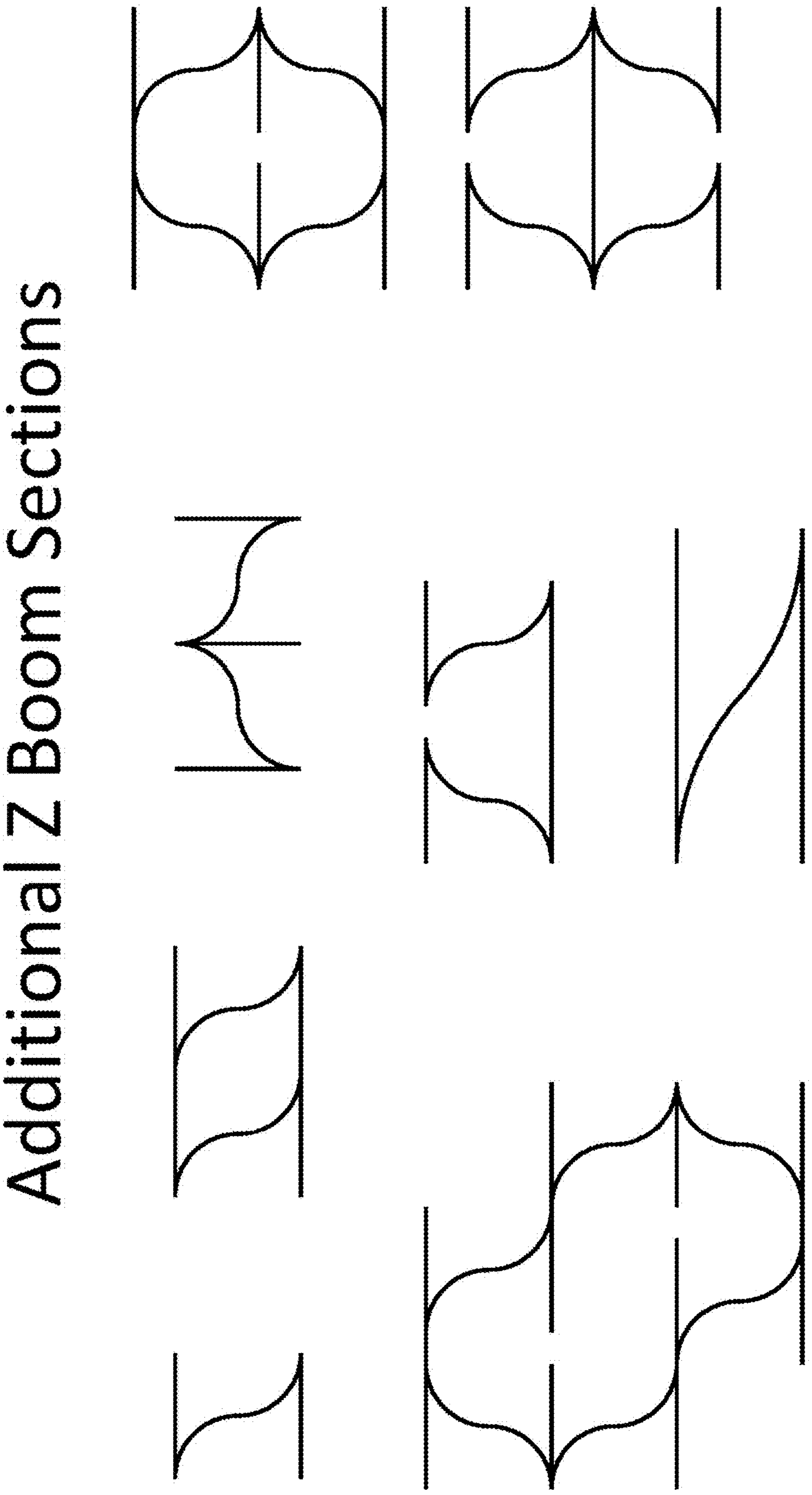
FIG. 9 shows another drawing showing end view cross section classes of exemplary Z Boom deformable structures.

FIG. 9 shows another drawing showing end view cross section classes of exemplary Z Boom deformable structures.

Figure 10:
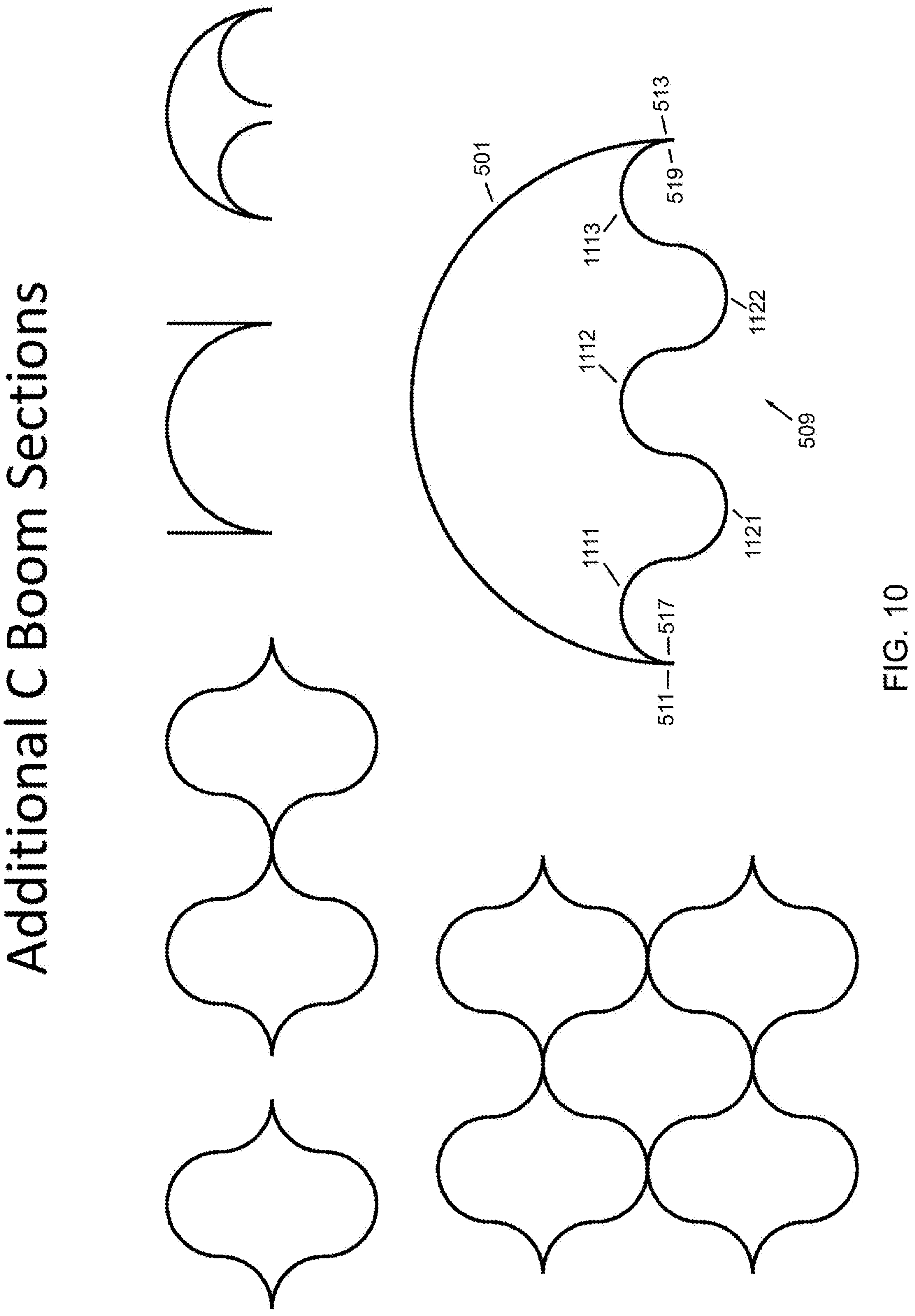
FIG. 10 shows another drawing showing end view cross section classes of exemplary C Boom deformable structures.

FIG. 10 shows another drawing showing end view cross section classes of exemplary C Boom deformable structures.

Figure 11:
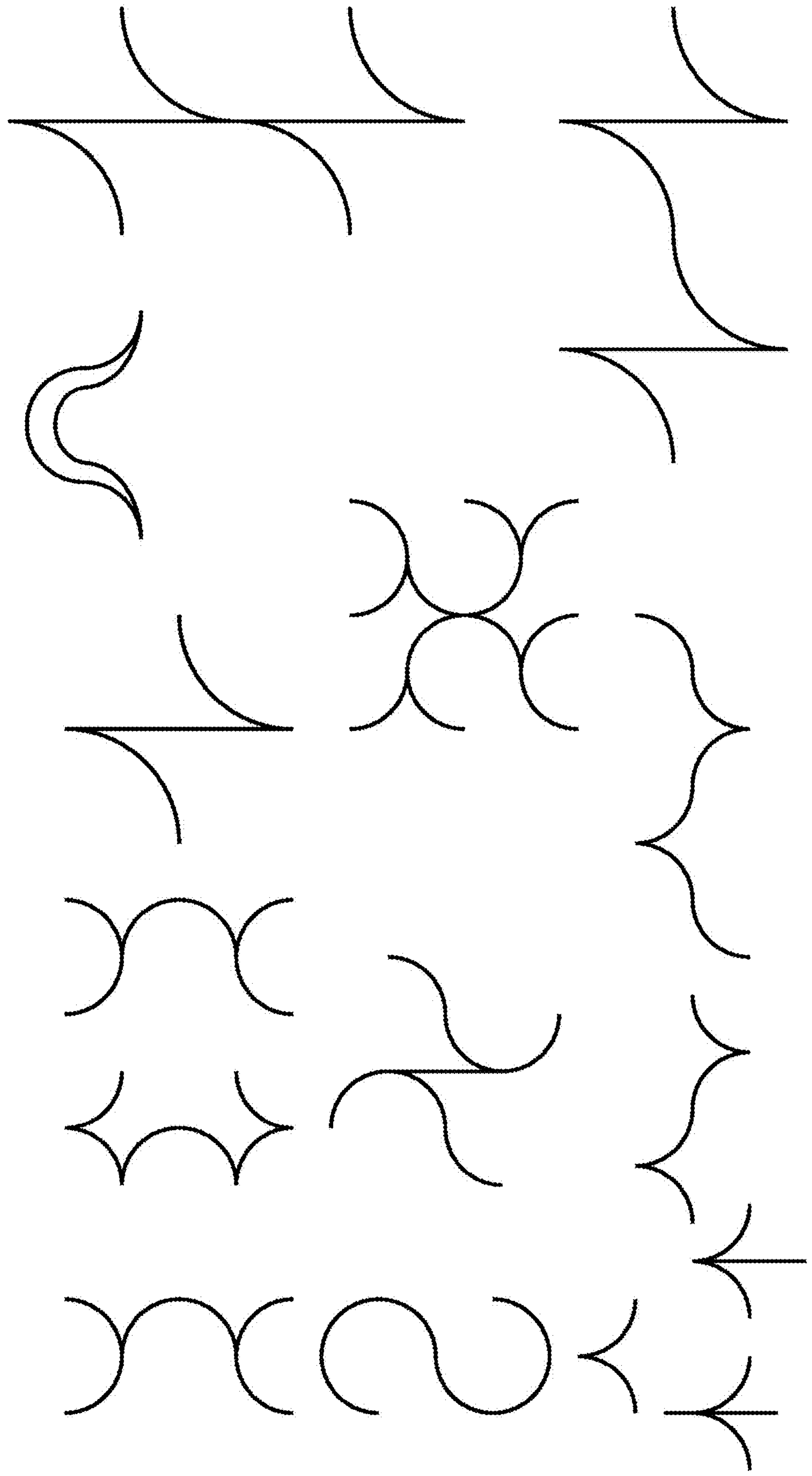
FIG. 11 shows yet another drawing showing end view cross section classes of exemplary C Boom deformable structures.

FIG. 11 shows yet another drawing showing end view cross section classes of exemplary C Boom deformable structures.

Figure 12:
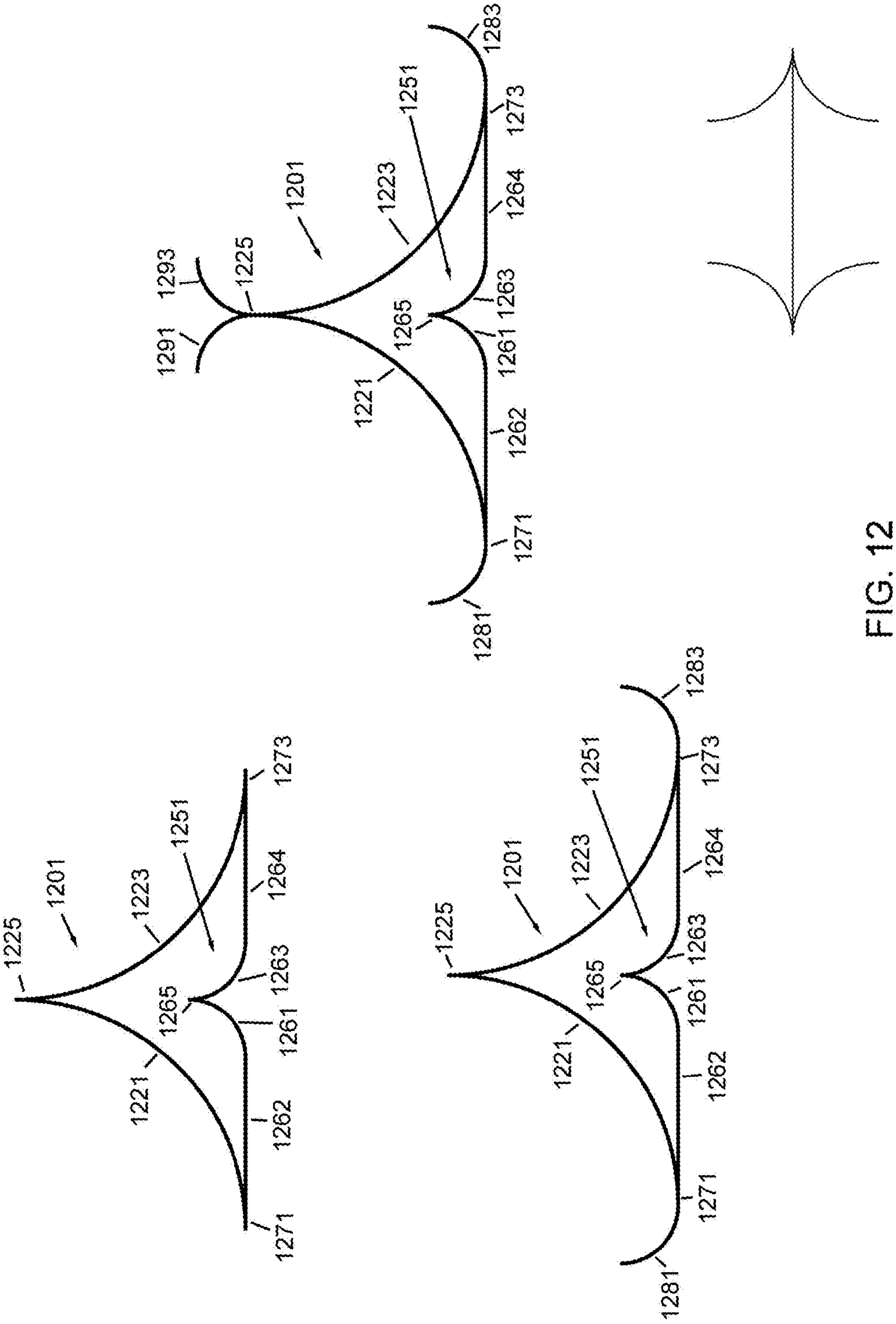
FIG. 12 shows yet another drawing showing end view cross section classes of exemplary C Boom deformable structures.

FIG. 12 shows yet another drawing showing end view cross section classes of exemplary C Boom deformable structures. In the top left and bottom two cross section drawings (end view) of FIG. 12, an end face cross section of the deformable beam or hinge includes a first about V shaped member 1201 defined by a pair of first member arcs 1221, 1223 joined at a first end of each first member arc to form a first vertex 1225. A second about V shaped member 1251 is defined by a pair of second member arcs 1261, 1263 joined at a first end of each second member arc to form a second vertex 1265. A pair of substantially flat trailing sections 1262, 1264 on either side of an opposite end of each second member arc 1261, 1263, and an opposite end of each first member arc is joined to an end of each of the pair of substantially flat trailing sections at joints 1271, 1273.

In the lower two cross sections of FIG. 12, at least one of the pair of substantially flat trailing sections on either side of an opposite end of each second member arc 1281, 1283 continues past a joined section 1271, 1273 and curves towards a direction about perpendicular to an axis of the pair of substantially flat trailing sections 1262, 1264.

In the lower right side cross sections of FIG. 12, at least one of the pair of first member arcs 1221, 1223 continues past 1291, 1293 a joined section at the first vertex 1225 and curves outward towards a direction about parallel to an axis of the pair of substantially flat trailing sections.

Another way to view or conceptualize the lower cross sections of FIG. 12 is as, two angled about C shaped members joined at a vertex with the ends of the about C shaped members disposed in two about flattened C shaped members sitting side by side. In the lower right side cross sections of FIG. 12, the two angled about C shaped members can also be viewed as joined at their shoulders.

Figure 13:
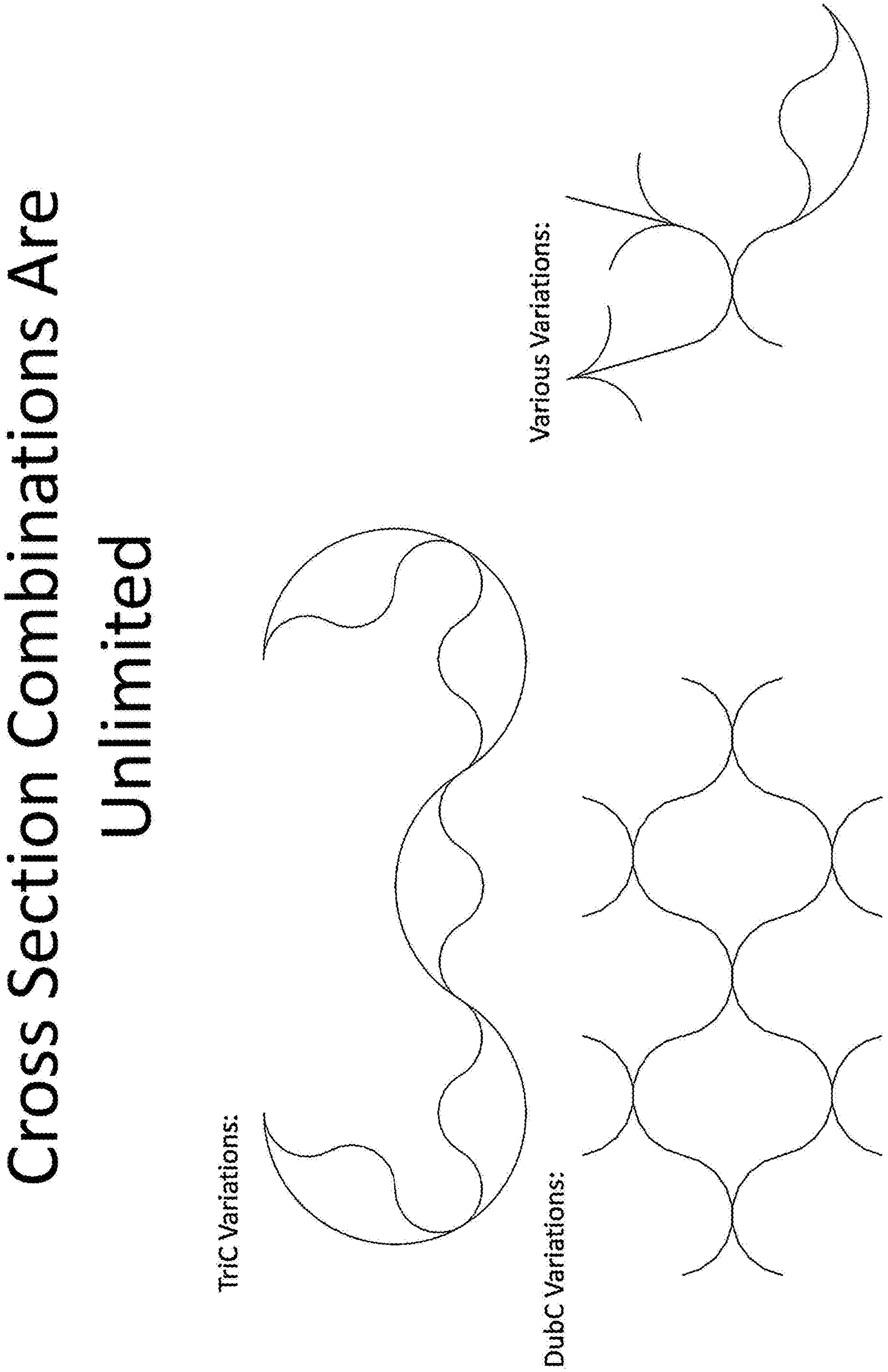
FIG. 13 shows yet another drawing showing end view cross section classes of exemplary TriC variation, DubC Variation, and other variation deformable structures.

FIG. 13 shows yet another drawing showing end view cross section classes of exemplary TriC variation, DubC Variation, and other variation deformable structures.

End Modifications

In most embodiments, the strongest and the stiffest structure is obtained by mounting a deformable structure such that one or both ends of the structure do not deform, i.e. the deformable structures are mounted by any suitable mounting means (e.g. bonded, clamped, bolted, etc.) to an effectively rigid structure.

However, the transition from the deformed flattened state to an un-deformed end can result in stress and strains that are much higher than those generally occurring in the main rolled section. These stress and strain concentrations can be alleviated by tailoring the geometry of the structure at the ends and also by tailoring the geometry of the un-deformed part of the hinge (the mount region).

Examples of such end modifications are shown in the drawings of FIG. 14-FIG. 17. The modifications include 1) Cut-outs (end geometry modification, cutout lines); 2) Mount modifications (changes to the effectively rigid mounting region, rigid lines); Structures may be mounted only by the solid rigid line or over the region encompassed by the dashed rigid line; and 3) Any suitable combinations of the two modifications.

Figure 14:
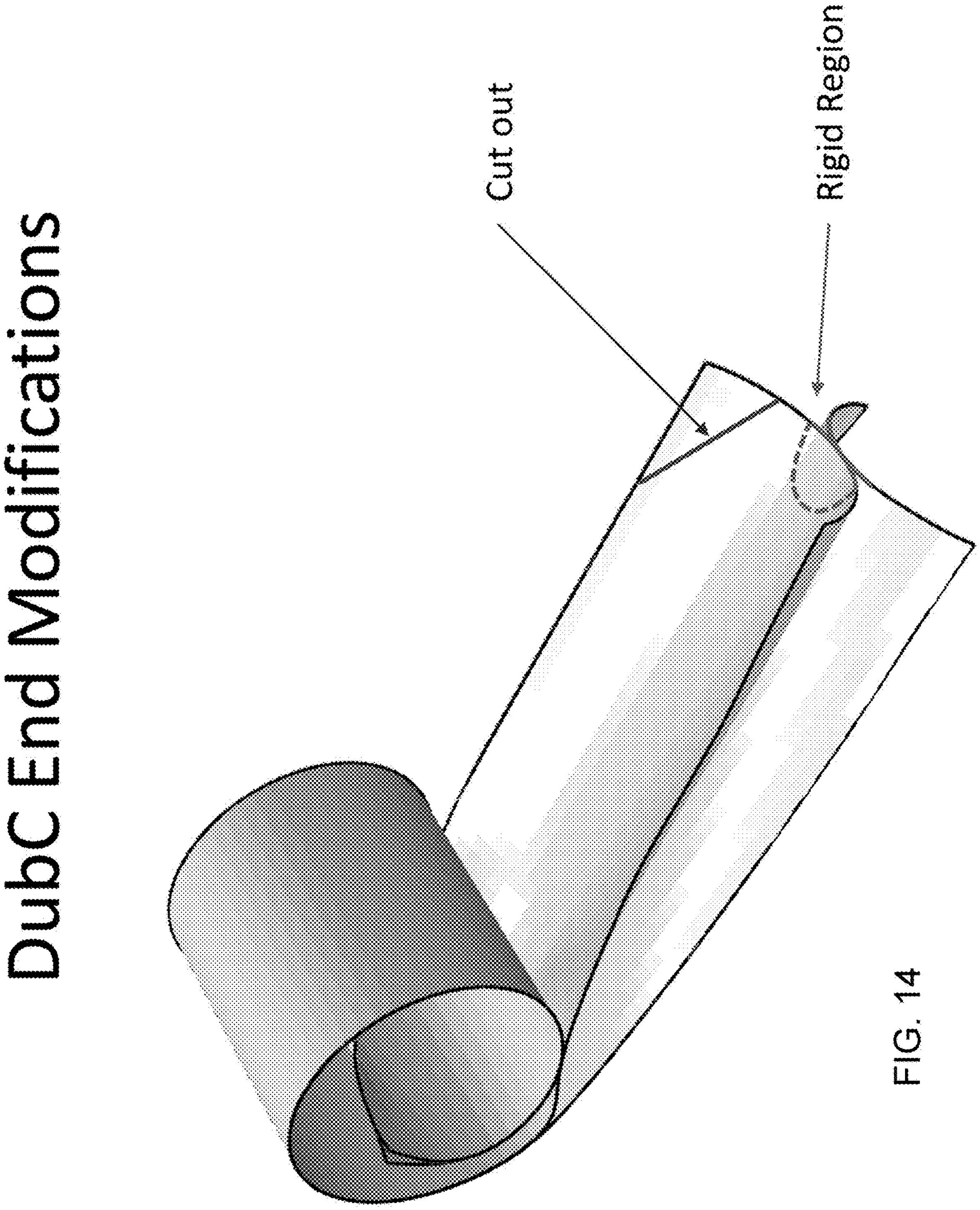
FIG. 14 shows exemplary DubC end modifications.
Figure 15:
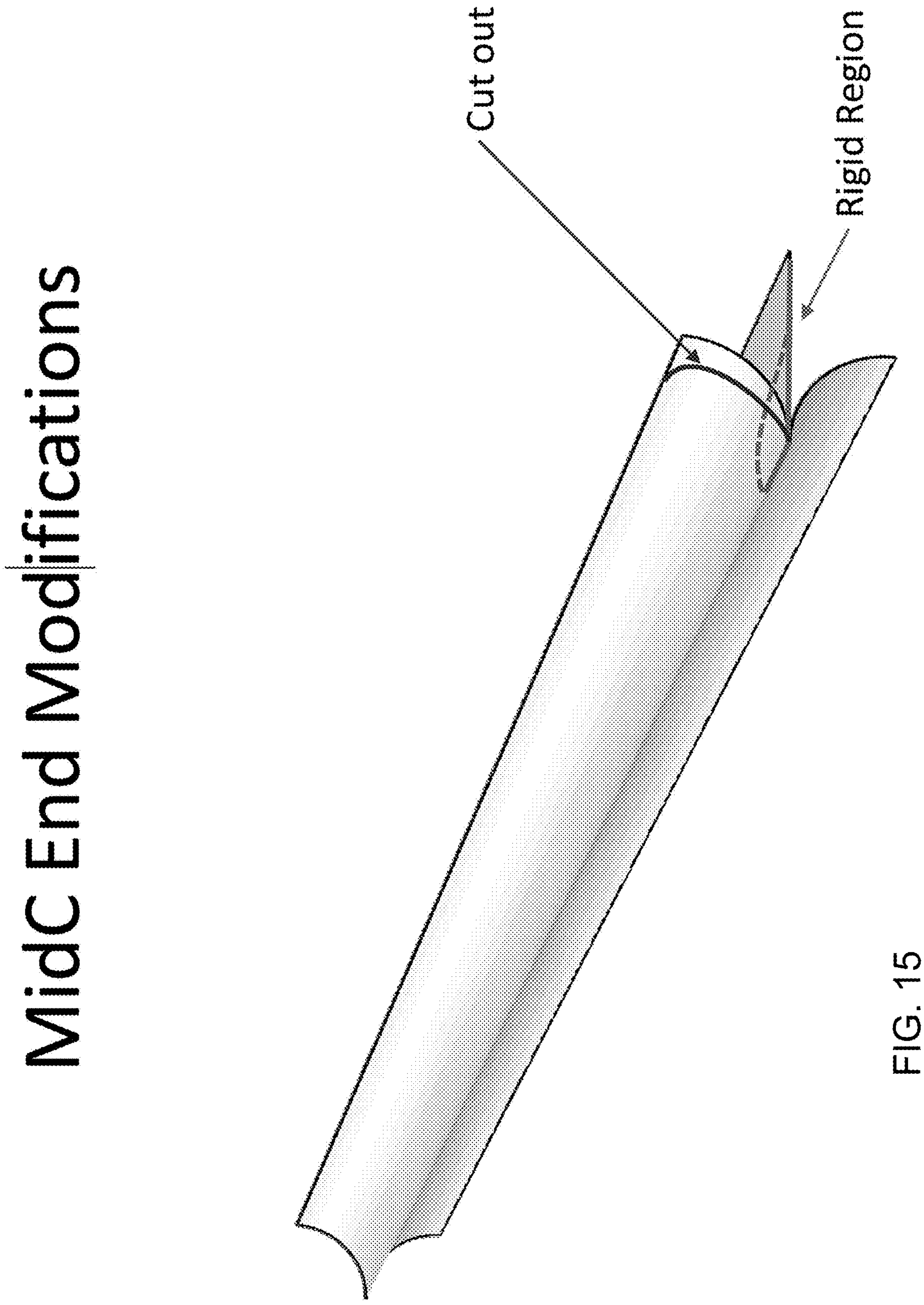
FIG. 15 shows exemplary MidC end modifications.
Figure 16:
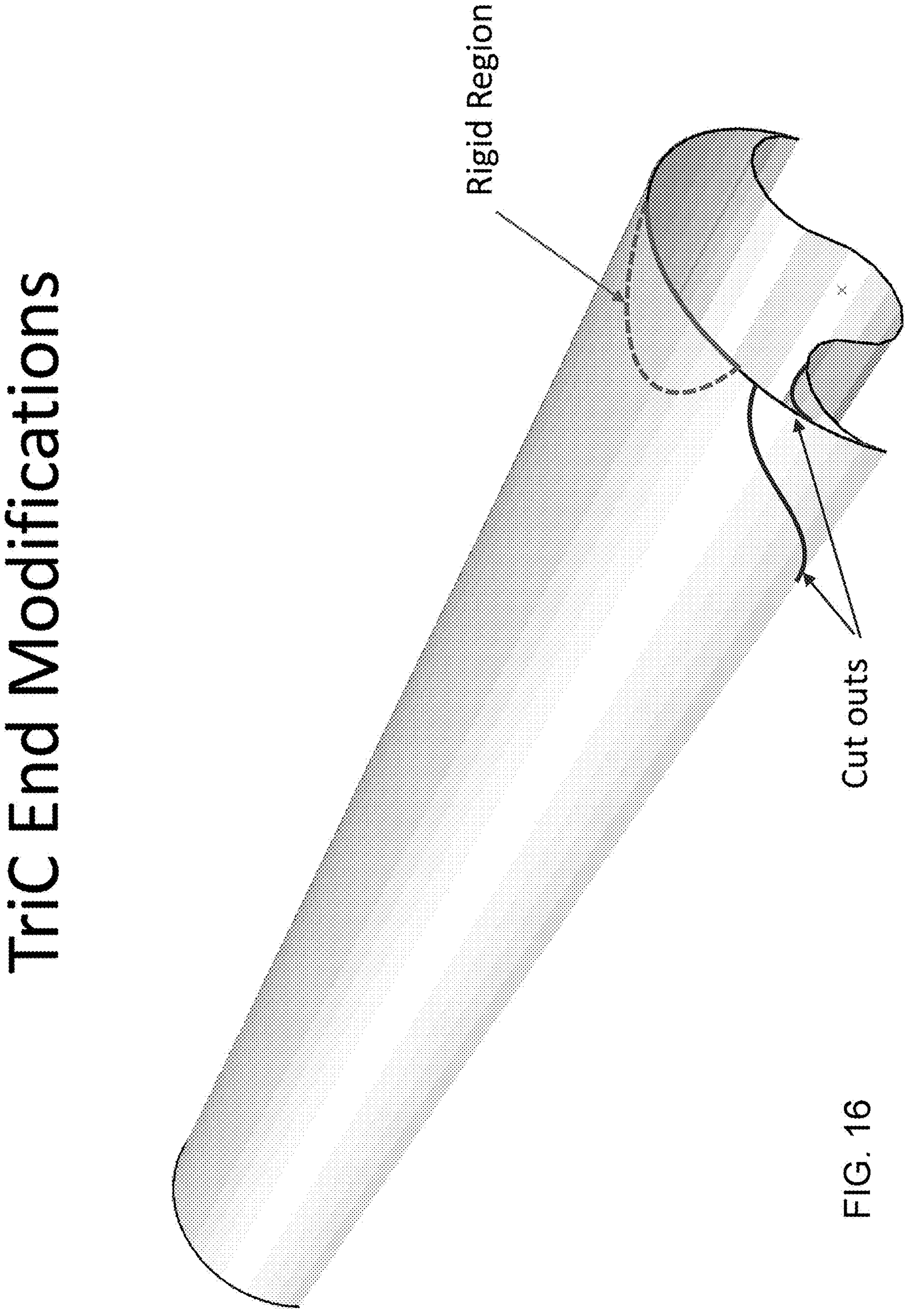
FIG. 16 shows exemplary TriC end modifications.
Figure 17:
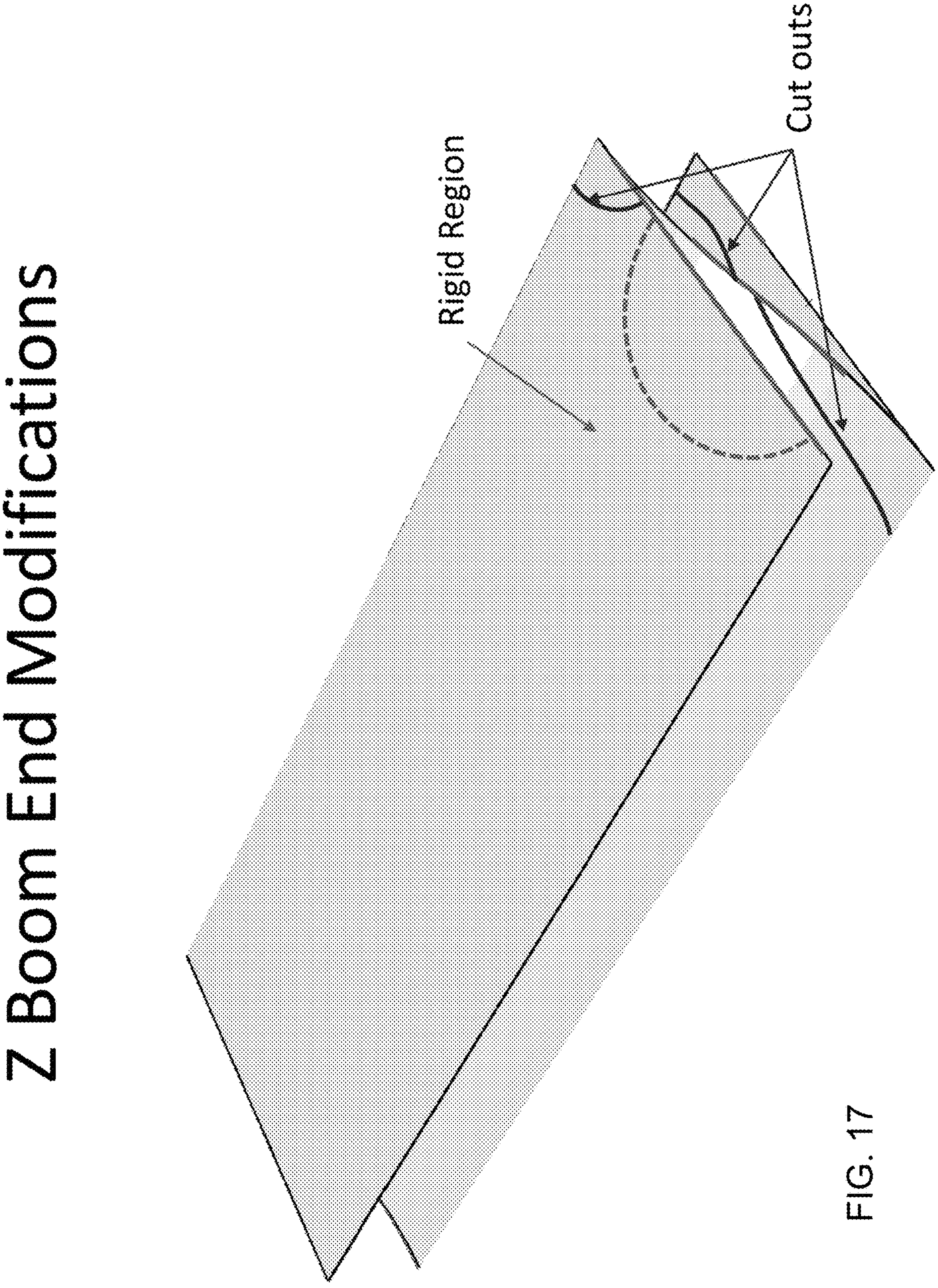
FIG. 17 shows exemplary Z Boom end modifications.

FIG. 14 shows exemplary DubC end modifications. FIG. 15 shows exemplary MidC end modifications. FIG. 16 shows exemplary TriC end modifications. FIG. 17 shows exemplary Z Boom end modifications.

Composite Laminates

Composite laminates are an example of a suitable material from which to make the deformable structures described in this Application. When fabricated from laminated fibrous (continuous or short fibers) composite materials, the fiber orientation within a ply can be tailored to achieve a better structure (stronger, stiffer, more deformable, increased dimensional stability, etc.). Also, the lamina and laminate thicknesses can be non-uniformly varied with the structure cross section to place more material where it is needed and less where it is not needed. The laminate can be modified to reduce mass, increased stiffness and strength in the extended state, reduce material stress and to enable more compact packaging in the rolled state, or to reduce stress concentrations in the ends.

Where thickness is added, the material could be a unidirectional (UD) type or balanced (B) type. The thickness variation is applicable to any material used in fabrication of the structure (e.g. metals and plastics).

The drawings of FIG. 18A to FIG. 25 show exemplary laminate configurations designed to achieve specific benefits. The 0° direction is parallel to the prismatic (long) axis on the structure (perpendicular to the plane of the cross section). The 90° direction lines with the plane of the cross section and is parallel to the laminate. Off axis directions (e.g. 45°) lie between 0° and 90° and are also parallel to the laminate.

Laminate plies are either Uni Directional (UD, all fibers in one direction) or Balanced (B, an equal number of fibers in the +θ and −θ directions). Balanced plies are readily achieved with weaves (e.g. plain weave with fibers at +45° and −45°) or with several plies of Uni Directional materials, e.g. [+θ/−θ], [+θ/−θ/+θ/−θ], and [+θ/−θ/−θ/+θ].

Laminates are described as: [ply 1/ply 2/ply 3/etc.] where "ply n" is either UD or B. UD is followed by the fiber direction (e.g. UD@0° to indicate a uni directional ply with fibers parallel to the long axis). "B" alone is understood to include any suitable type of balanced ply. It shall also include [0/90] woven and UD laminates and variations. Where the laminate is not symmetric, e.g. [UD@0/B], the reversed laminate is also claimed, as in [B/UD@0]. Some or all B plies may be replaced with "T" plies where T indicates the ply is continuous or short fiber textile made by braiding or weaving processes. T plies may have groups of fibers in 0, 90, +45, −45, theta, any combination of these orientations and relative quantities.

Figure 18A:
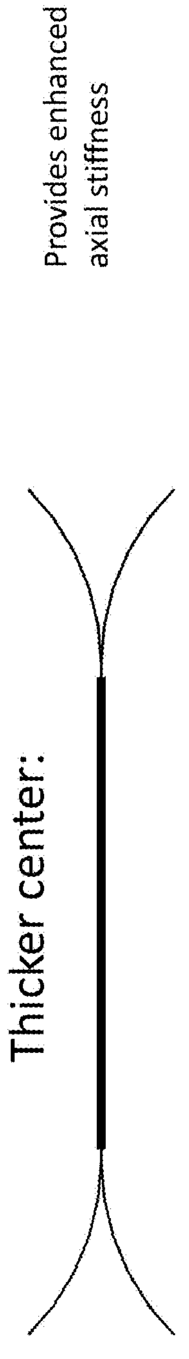
FIG. 18A shows end view of a DubC deformable structure having a thicker center relative to the tips.
Figure 18B:
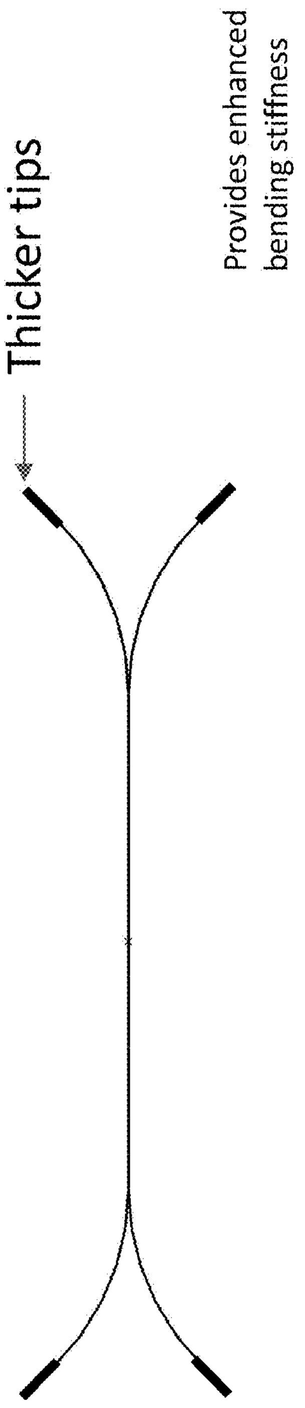
FIG. 18B shows end view of a DubC deformable structure having thicker tips relative to the center portion.

FIG. 18A and FIG. 18B show drawings of DubC structures with a laminate thickness variation across the structure. FIG. 18A shows end view of a DubC deformable structure having a thicker center relative to the tips, which provides an enhanced axial stiffness. FIG. 18B shows end view of a DubC deformable structure having thicker tips relative to the center portion, which provides an enhanced bending stiffness.

Figure 19A:
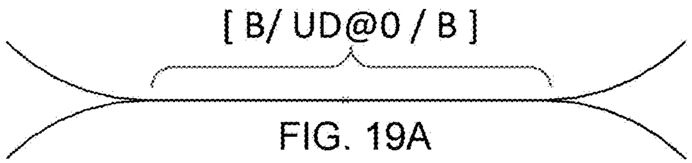
FIG. 19A shows an end view of a DubC deformable structure with a [B/UD@0/B] central portion and [B] ends.
Figure 19B:
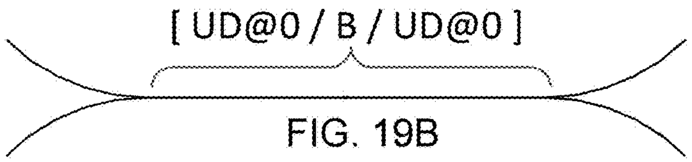
FIG. 19B shows an end view of a DubC deformable structure with a [UD@0/B/UD@0] central portion and [B] ends.
Figure 19C:
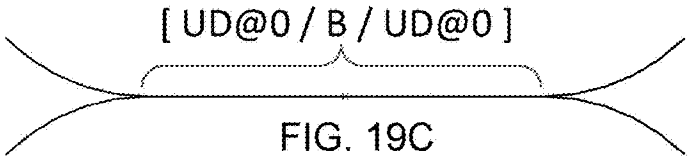
FIG. 19C shows an end view of a DubC deformable structure with a [UD@0/B/UD@0] central portion and [B/UD@0] ends.
Figure 19D:
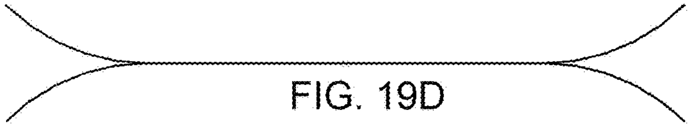
FIG. 19D shows an end view of a DubC deformable structure of substantially all [B/UD@0/B]
Figure 19E:
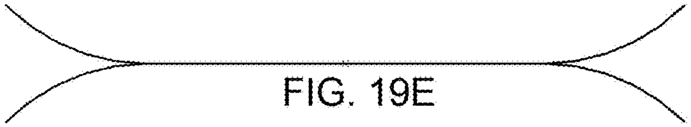
FIG. 19E shows an end view of a DubC deformable structure of substantially all [UD@0/B/UD@0]

FIG. 19A-FIG. 19D show drawings of various DubC fiber orientations. FIG. 19A shows an end view of a DubC [B/UD@0/B] center, [B] ends deformable structure, which provides an enhanced axial stiffness. FIG. 19B shows an end view of a DubC [UD@0/B/UD@0] center [B] ends deformable structure, which provides an enhanced bending stiffness. FIG. 19C shows an end view of a DubC [UD@0/B/UD@0] center [B/UD@0] ends deformable structure, which provides an enhanced bending stiffness. FIG. 19D shows an end view of a DubC of substantially all [B/UD@0/B] deformable structure, which provides an enhanced torsional stiffness. FIG. 19E shows an end view of a DubC deformable structure of substantially all [UD@0/B/UD@0]. These variations show the benefits of 1) modification of the laminate stacking sequence and 2) modification of relative lamina thicknesses. Laminate stacking sequence is more uniform and easier to fabricate while modification of relative lamina thickness offers higher performance, but is more complex and difficult to fabricate.

Figures 20A, 20B:
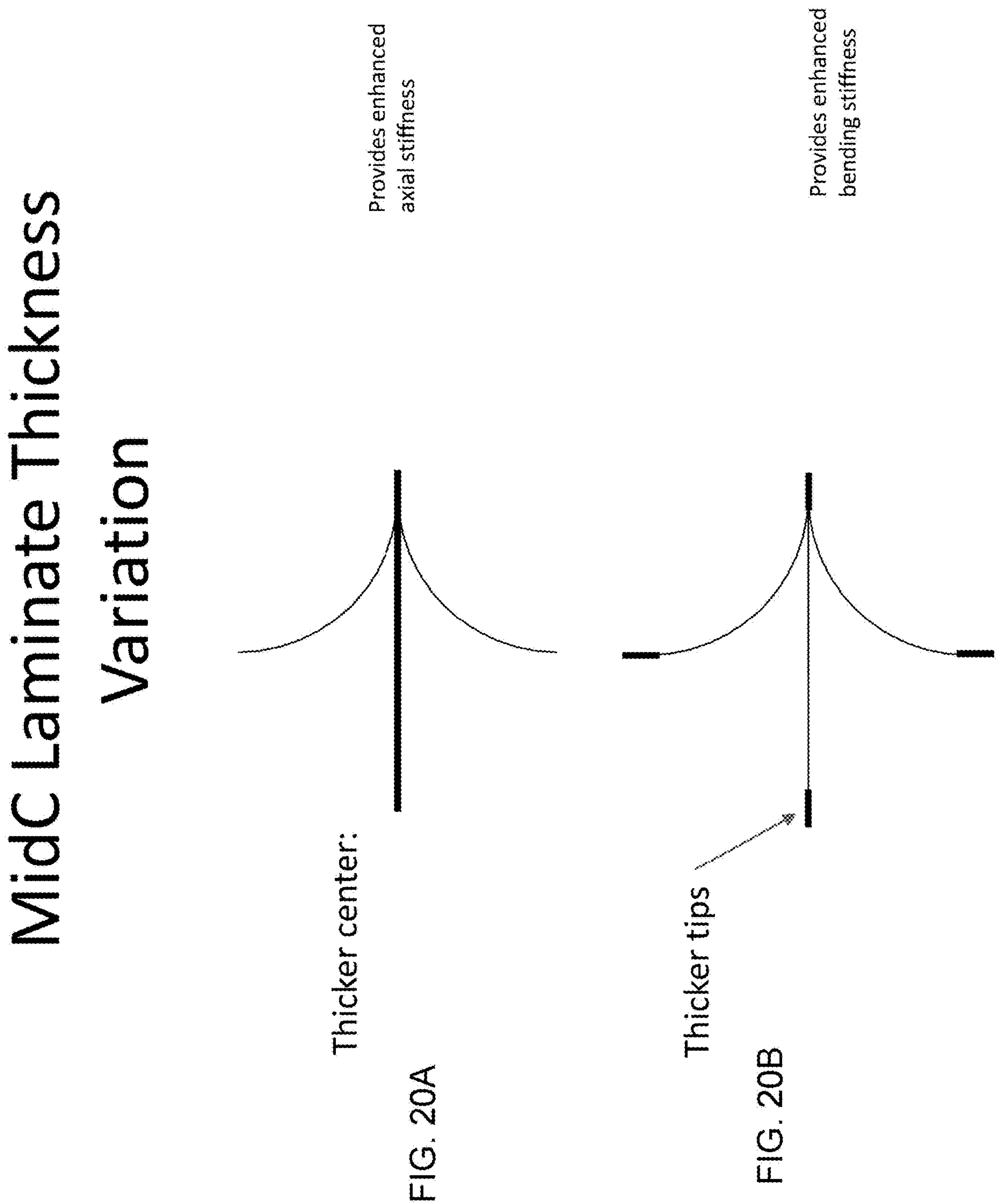
FIG. 20A shows a drawing of MidC deformable structure with a thicker center relative to the tips.
FIG. 20B shows a drawing of MidC deformable structure with thicker tips relative to the center.

FIG. 20A-FIG. 20B show drawings of various MidC laminate thickness variations. FIG. 20A shows a drawing of MidC deformable structure with a thicker center relative to the tips, which provides an enhanced axial stiffness. FIG. 20B shows a drawing of MidC deformable structure with thicker tips relative to the center, which provides an enhanced bending stiffness.

Figures 21A, 21B, 21C:
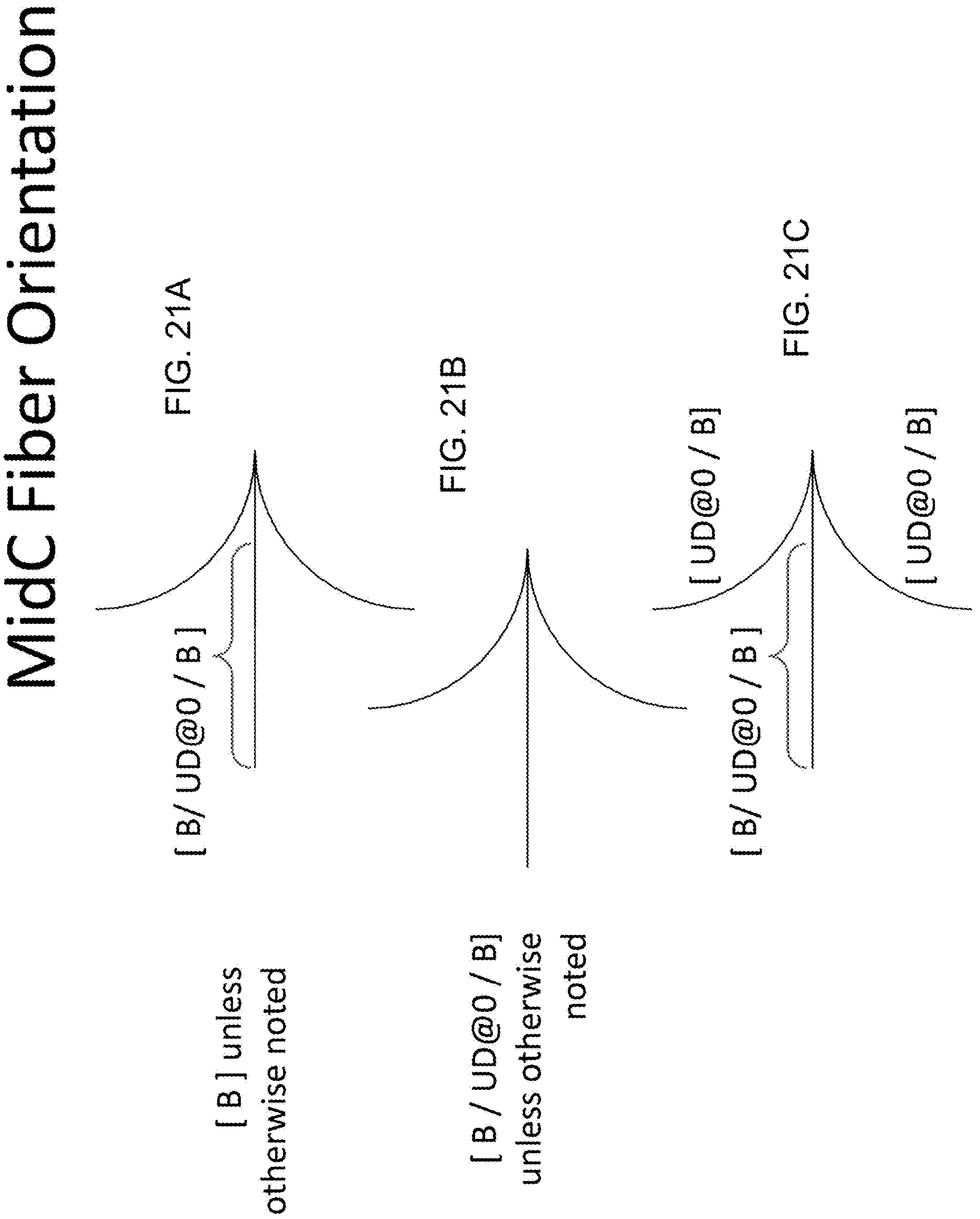
FIG. 21A shows an end view of a MidC center member [B/UD@0/B] and curved members of [B]
FIG. 21B shows an end view of a MidC deformable structure substantially all of [B/UD@0/B]
FIG. 21C shows an end view of a MidC deformable structure, with a [B/UD@0/B] central member and curved members of [B/UD@0/B]

FIG. 21A-FIG. 21C show drawings of various MidC fiber orientations. FIG. 21A shows an end view of a MidC center member [B/UD@0/B] and curved members of [B] deformable structure, which provides an enhanced axial stiffness. FIG. 21B shows an end view of a MidC deformable structure substantially all of [B/UD@0/B], which provides an enhanced bending strength. FIG. 21C shows an end view of a MidC deformable structure, with a [B/UD@0/B] central member and curved members of [B/UD@0/B], which provides a low mass balance between stiffness and strength.

Figures 22A, 22B, 22C:
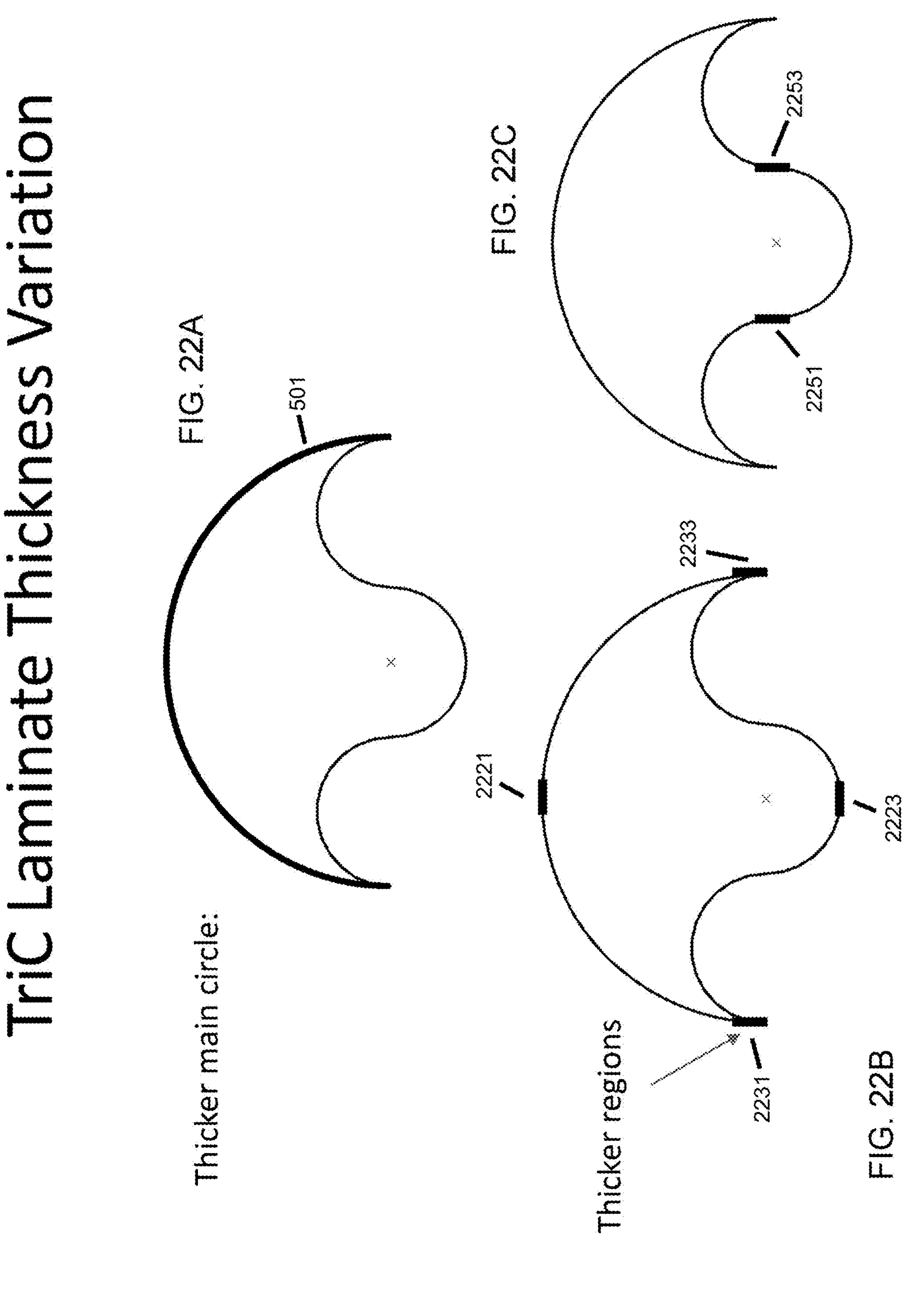
FIG. 22A shows an end view of a TriC deformable structure with a thicker main circle portion relative to the other portions of the TriC structure.
FIG. 22B shows an end view of a TriC deformable structure with noted thicker regions relative to the other portions of the TriC structure.
FIG. 22C shows an end view of a TriC deformable structure with different noted thicker regions relative to the other portions of the TriC structure.

FIG. 22A-FIG. 22C show drawings of various TriC laminate thickness variations. FIG. 22A shows an end view of a TriC deformable structure with a thicker main circle portion relative to the other portions of the TriC structure. FIG. 22B shows an end view of a TriC deformable structure with noted thicker regions relative to the other portions of the TriC structure. FIG. 22C shows an end view of a TriC deformable structure with different noted thicker regions relative to the other portions of the TriC structure.

Figure 23A:
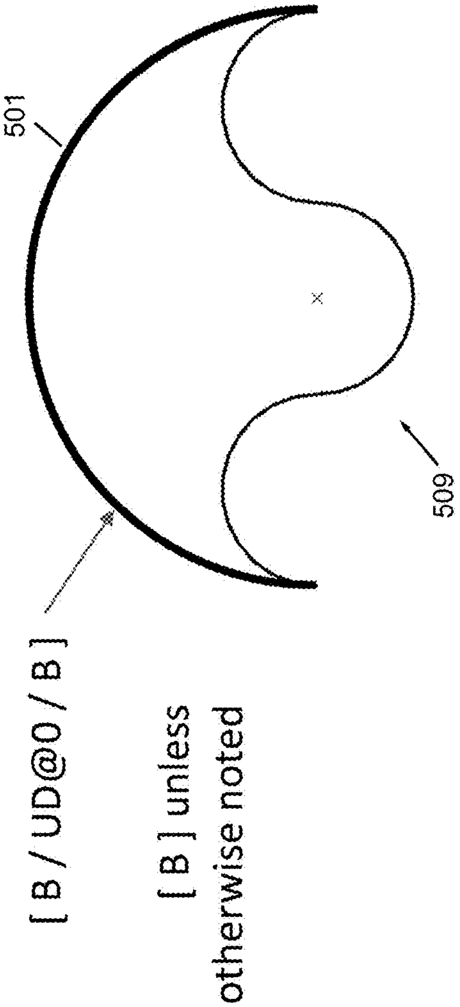
FIG. 23A shows an end view of a TriC deformable structure with a [B/UD@0/B] main circle portion, where the other portions are [B]
Figure 23B:
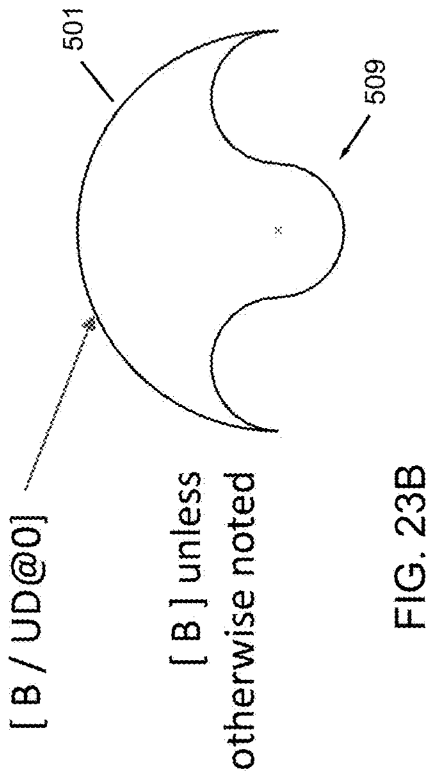
FIG. 23B shows an end view of a [B] type TriC deformable structure with a [B/UD@0/B] main circle portion, where the other portions are [B]
Figure 23C:
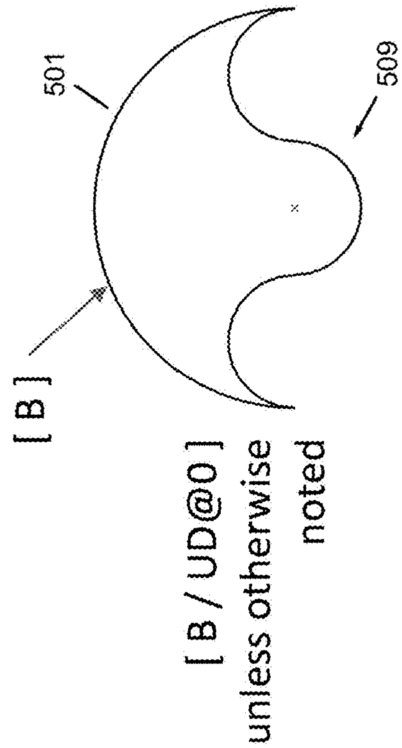
FIG. 23C shows an end view of a TriC deformable structure with a [B] main circle portion, where the other portions are [B/UD@0]

FIG. 23A-FIG. 23C show drawings of various TriC fiber orientations. FIG. 23A shows an end view of a TriC deformable structure with a [B/UD@0/B] main circle portion, where the other portions are [B], which provides an enhanced axial stiffness. FIG. 23B shows an end view of a [B] type TriC deformable structure with a [B/UD@0] main circle portion, where the other portions are [B], which provides an enhanced torsional stiffness. FIG. 23C shows an end view of a TriC deformable structure with a [B] main circle portion, where the other portions are [B/UD@0], which provides an enhanced thermal stability.

Figure 24A:
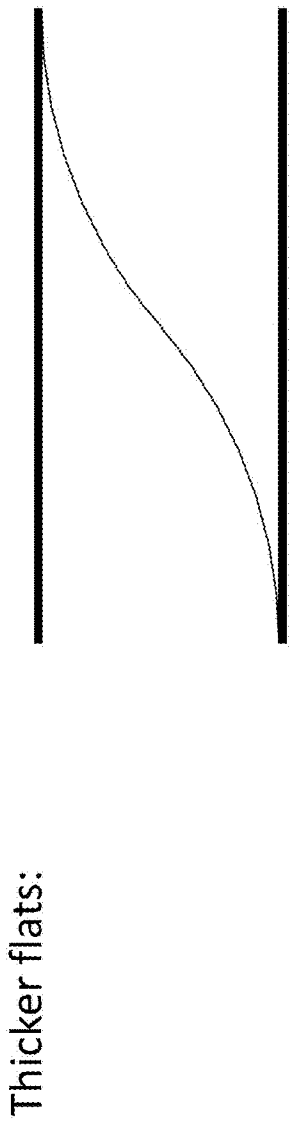
FIG. 24A shows a drawing of Z Boom deformable structure with thicker flats relative to the center curved portion.
Figure 24B:
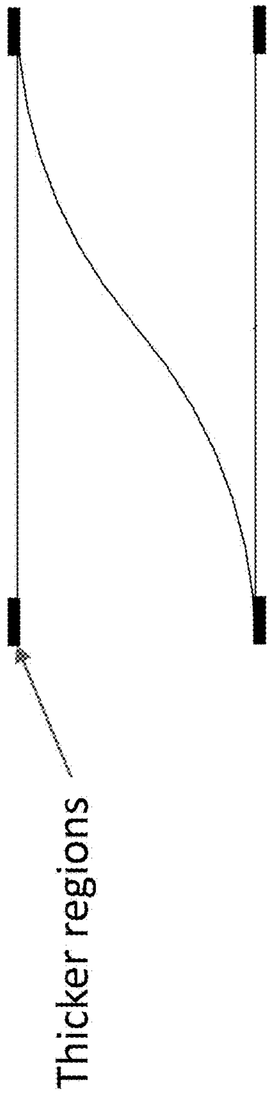
FIG. 24B shows a drawing of Z Boom deformable structure with noted thicker regions relative to the other portions.

FIG. 24A-FIG. 24B show drawings of various Z Boom laminate thickness variations. FIG. 24A shows a drawing of Z Boom deformable structure with thicker flats relative to the center curved portion, which provides an enhanced axial and bending stiffness. FIG. 24B shows a drawing of Z Boom deformable structure with noted thicker regions relative to the other portions, which provides an enhanced bending stiffness with low mass.

Figure 25:
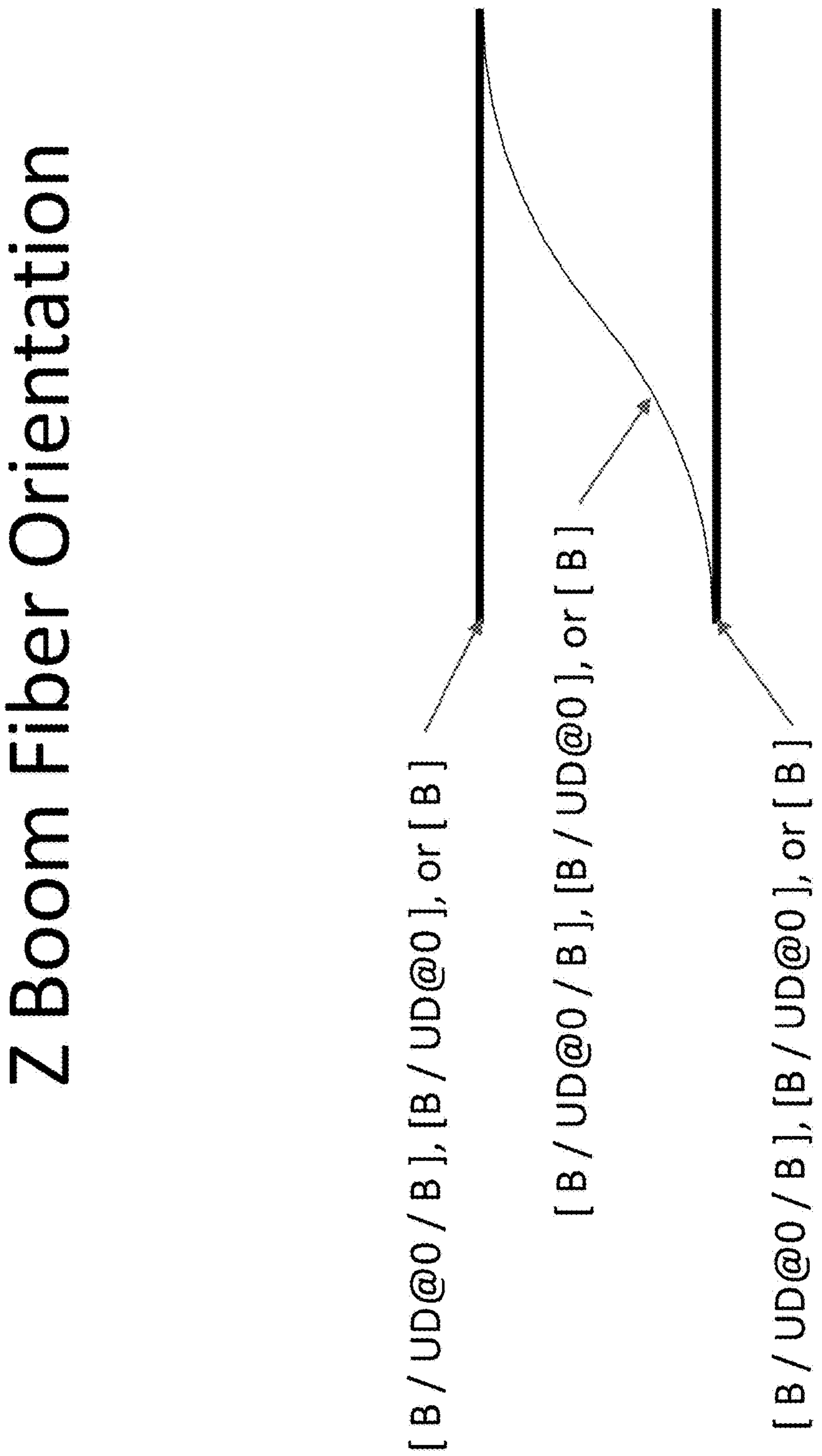
FIG. 25 shows drawings of various Z Boom fiber orientations.
Figure 26:
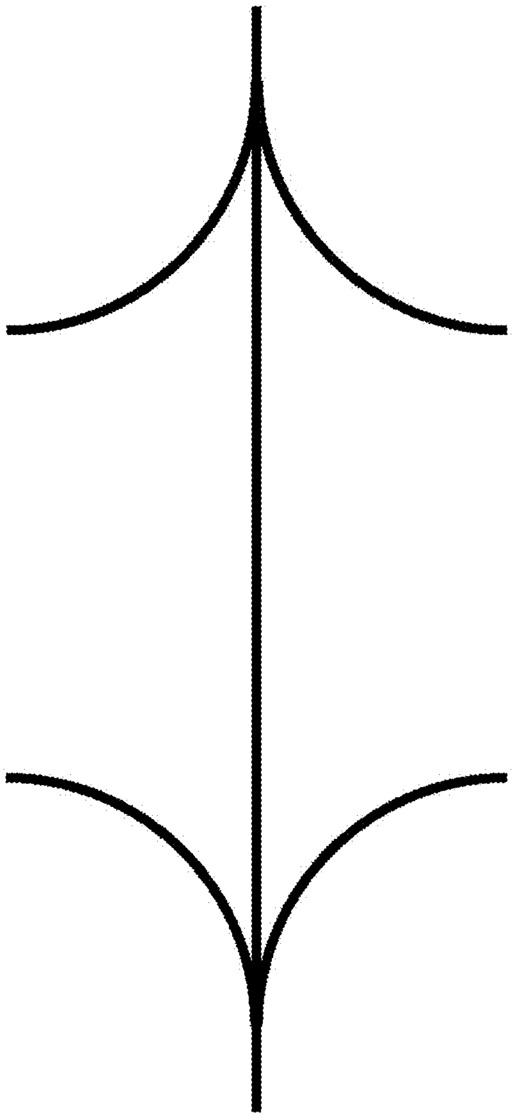
FIG. 26 shows a drawing of another exemplary MidC deformable structure with double opposing portions.

FIG. 25 show drawings of various Z Boom fiber orientations. As shown by FIG. 25, the either or both of the flats and/or the center curved portion can included any of the [B/UD@0/B], [B/UD@0], and/or [B] fiber orientations or any combinations thereof.

Deformable structures can be made from any suitable relatively thin material that can be shaped to the desire cross section. While composite materials often provide the highest performance, they may be expensive, difficult to acquire, difficult to fabricate, or not have appropriate physical properties (strength, conductivity, density, thermal expansion) for an application. Alternate materials are relatively thin metal sheets, for example spring tempered steal, brass, aluminum, copper, nickel, titanium, and alloys containing these metals. Deformable structures can also be formed from plastic sheets, for example, polyamide, polyimide, thermosets, and thermoplastics. Beam flattened widths are typically 10 to 1,000 times the material thickness.

Figure 27A:
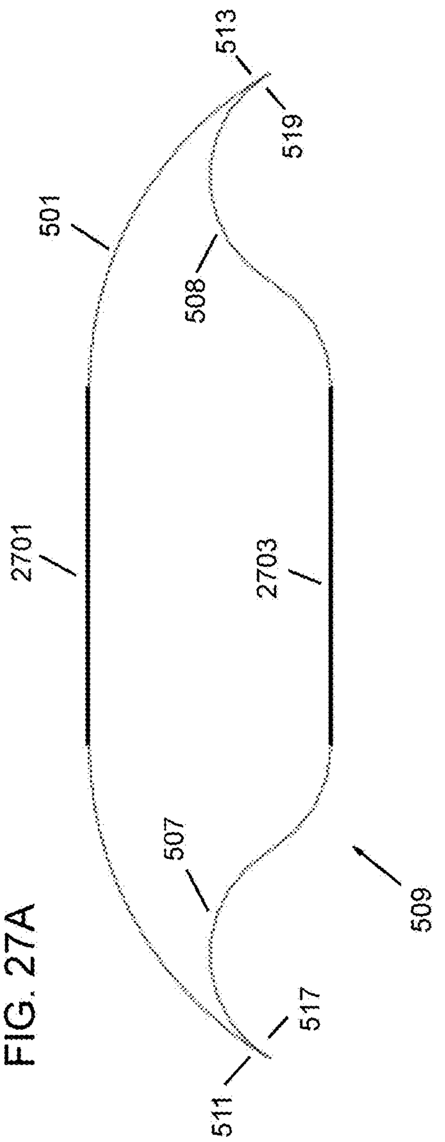
FIG. 27A shows a drawing of yet another exemplary TriC deformable structure with about flat sections.
Figure 27B:
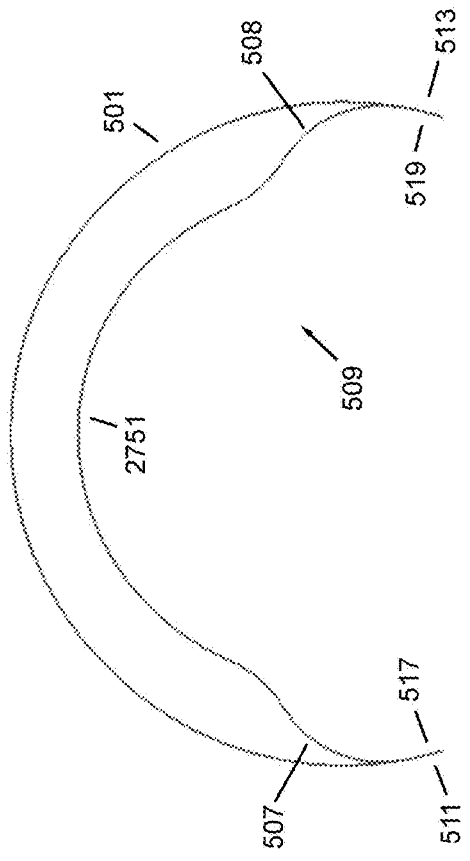
FIG. 27B shows a drawing of yet another exemplary TriC deformable structure with about circular sections.
Figure 27D:
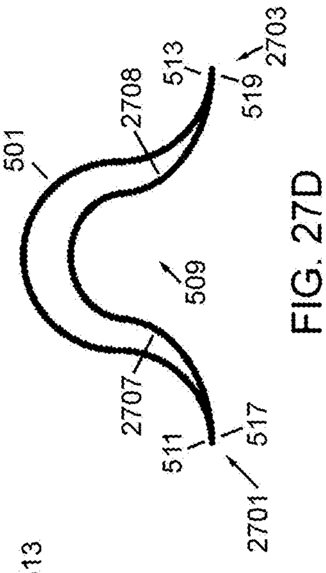
FIG. 27D shows a drawing of yet another exemplary TriC deformable structure with an outward facing jointed member ends.
Figure 27C:
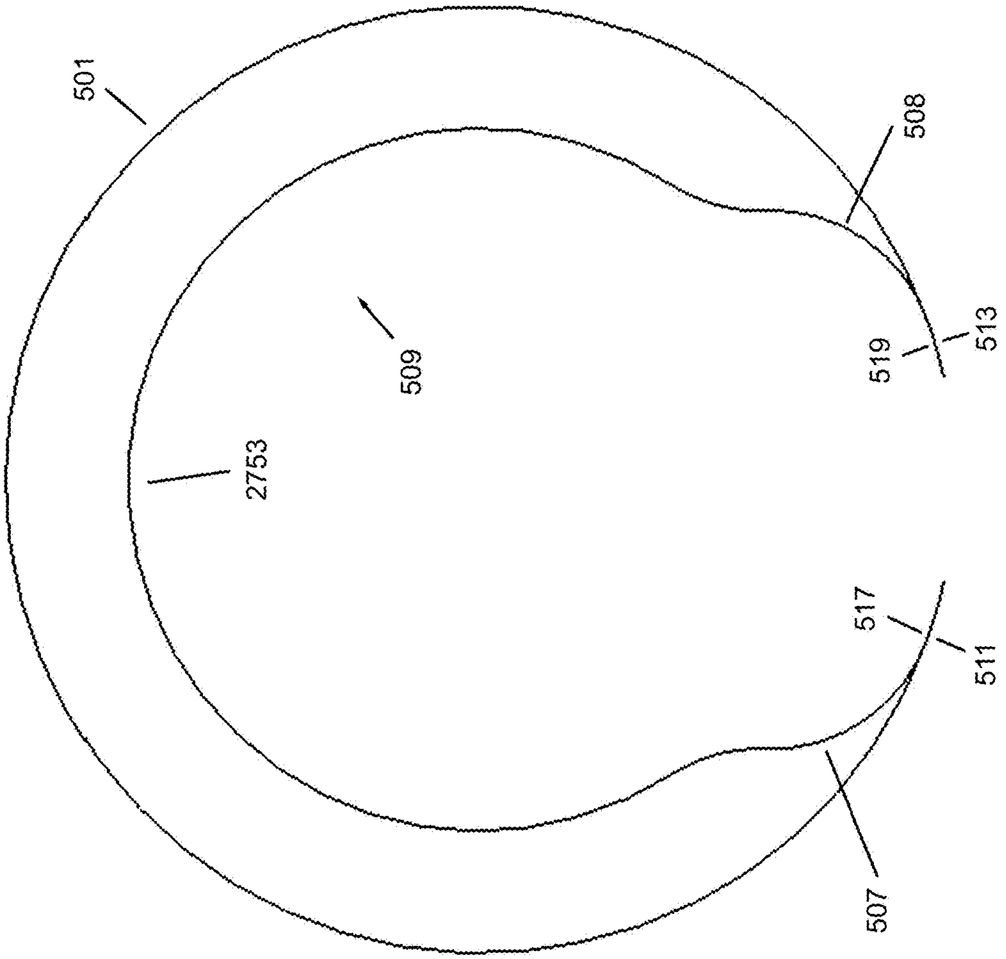
FIG. 27C shows a drawing of yet another exemplary TriC deformable structure with near or about circular sections.

FIG. 27A shows a drawing of yet another exemplary TriC deformable structure with about flat sections. FIG. 27B shows a drawing of yet another exemplary TriC deformable structure with about circular sections. FIG. 27C shows a drawing of yet another exemplary TriC deformable structure with near or about circular sections. FIG. 27D shows a drawing of yet another exemplary TriC deformable structure with near or about circular sections where the about circular sections including the C sections have a main curve which instead of closing as a circle (e.g. FIG. 27B, FIG. 27C), turns out or outwards, or flares out or outwards, at either end, such as into substantially flat or straight sections 2701, 2703 in an outward direction from a center of the main C curve. In the embodiment of FIG. 27D, the periodic C curved member 509 defines at least two about C shaped curves 2707, 2708.

Figure 28:
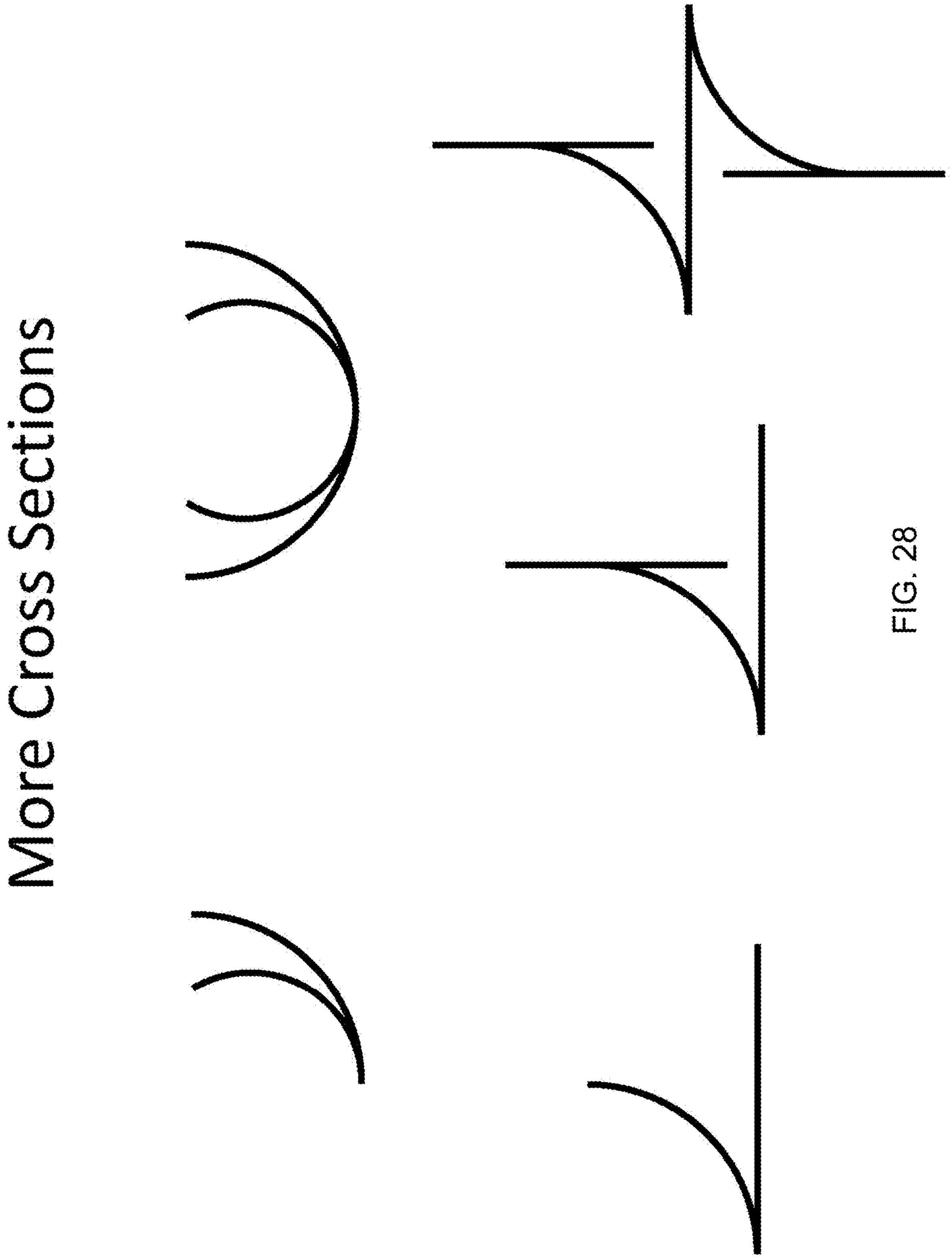
FIG. 28 shows yet another drawing showing end view cross section classes of exemplary TriC variation, DubC Variation, and other variation deformable structures.

FIG. 28 shows yet another drawing showing end view cross section classes of exemplary TriC variation, DubC Variation, and other variation deformable structures.

Any of the deformable structures can be made to have less mass ("light weighted") by cutting out or otherwise removing sections along the length of one or more of the members of a beam (including booms) or hinge. Any suitable number of any suitable sized cutouts can be used. Any suitable cutout shape can be used, such as, for example, circular shape, elliptical shape, square shape, rectangular shape, triangular shape, trapezoid shape, polygon shape, etc.

All of the optional properties, such as, material composition, fiber orientation, and member thickness apply in any combination thereof to all of the described deformable structures.

Deformable structures can be fabricated from any process that can achieve the desired cross section. Example continuous processes include extrusion, pultrusion, pulwinding, pulbraiding, etc. These processes can involve fibrous materials, bulk materials, and any combination thereof. Example fixed length processes include milling, molding, and thermoforming. Deformable structures can be injection molded, bladder molded, roll wrapped, open molded, closed molded, resin transfer molded, vacuum assisted resin transfer molded, formed using sheet molding compounds. Cross section pieces can be made independently by any of the above processes and later joined by any of several joining processes including bonding, welding, fastening, and interlocking.

According to one aspect, an apparatus includes at least one or more deformable structure of the type DubC Boom, DubC Hinge, MidC, TriC Boom, TriC Hinge, Z Boom, Z Hinge, and any cross section combinations thereof. The at least one or more deformable structure optionally includes one or more end modifications. The at least one or more deformable structure optionally includes a composite laminate. The at least one or more deformable structure can be used in one or more of the following: Suspension flexures (wheels, mountain bikes, road bikes, ATVs, etc.), Tape measures, Hinges, booms, beams, masts, Hinges/structures for unfolding consumer products: display assemblies, shades, Photography screens and shades, Umbrella and parasols, Tents, Cots, beds, stretchers, Ladders (hunting, photography, wildlife observation, fishing), Folding Beams/poles to push/pull with, anchor with, support cameras and sensors, above and under water, Antennas (Wi-Fi, Radio, cell phone, RF, TV, satellite phone/tv), Backpacks, Springs (leaf, tension, compression, torsion, etc.), Wagons, strollers, chairs, Sun shades, awnings, retractable roofs, Replace mechanical (pin-clevis) hinges, Replace telescoping tubes, Unfolding containers (boxes and bags), Flexure hinges for precision positioning systems, Sealed hinges, Orthotics and prosthetics, Control surface actuator hinges, Compliant mechanisms (morphing structures), Deployable space and terrestrial antennas, Deployable space booms, Deployable space structures (tape-spring structures and solar arrays, solar sails), Deployable wings and airfoils, Parafoils, parafoils stiffeners, parachute deployment device, Deployable atmospheric decelerators, shallow water anchors, and, Medical braces and splints.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A deformable device comprising:

a deformable beam or hinge having an extended state, a flattened state, and a rolled state if a beam, where a stiffness and strength of the deformable beam or hinge in the extended state is greater than a different stiffness and strength of the deformable beam or hinge in the flattened state, said deformable beam or hinge deformable along a long axis;

an end face cross section of said deformable beam or hinge transverse to said long axis comprising:

a main C curved member defining an about circular shape of an arc ranging between about a quarter arc and a substantially full circle, said main C curved member having a first main C curved member end and a second main C curved member end; and a periodic C curved member defining at least two about C shaped curves, said periodic C curved member having a first periodic C curved member end mechanically coupled to said first main C curved member end, and a second periodic C curved member end mechanically coupled to said second main C curved member end.

2. The deformable device of claim 1, wherein at least one of said first periodic C curved member end is joined to said first main C curved member end inside of said main C curved member or said second main C curved member end is joined to said second periodic C curved member end inside of said main C curved member.

3. The deformable device of claim 1, wherein said main C curved member and said periodic C curved member comprise about a same arc length.

4. The deformable device of claim 1, wherein said deformable beam or hinge comprises a TriC structure.

5. The deformable device of claim 4, wherein said periodic C curved member comprises about two and a half cycles of alternating C shapes.

6. The deformable device of claim 4, wherein said periodic C curved member comprises about two and a half cycles of an about sinusoidal shaped curve.

7. The deformable device of claim 1, wherein at least one of said main C curved member or said periodic C curved member comprise an additional different shape.

8. The deformable device of claim 7, wherein said additional different shape comprises a substantially straight line.

9. The deformable device of claim 7, wherein said periodic C curved member comprises at least one C shape larger than either of two smaller C shapes on either end of said at least one C shape.

10. The deformable device of claim 9, wherein said at least one C shape larger than either of two smaller C shapes follows a path about parallel to said main C curved member.

11. The deformable device of claim 10, wherein said main C curved member comprises an arc length of up to about 350 degrees arc of a full circle.

12. The deformable device of claim 1, wherein said deformable device comprises a fibre structure selected from the group consisting of [B], [B/UD/B], [UD/B/UD], and any combination thereof.

13. The deformable device of claim 1, wherein said main C curved member comprises a [B/UD@0/B] fibre structure or a [B/UD@0] or a [B] fibre structure.

14. The deformable device of claim 1, wherein at least one member of said deformable device comprises at least one cut out along a length of said member.

15. The deformable device of claim 1, wherein said main C curved member comprises a different thickness relative to said periodic C curved member.

16. The deformable device of claim 1, wherein at least one member of said main C curved member or said periodic C curved member comprises a variation in thickness across said at least one member.

17. The deformable device of claim 1, wherein at least one joined section of an end of said main C curved member with an end of said periodic C curved member extends in a direction about outward from said main C curve member.

18. A deformable device comprising:

a deformable beam or hinge having an extended state, a flattened state, and a rolled state if a beam, where a stiffness and strength of the deformable beam or hinge in the extended state is greater than a different stiffness and strength of the deformable beam or hinge in the flattened state;

an end face cross section of said deformable beam or hinge comprising:

a first about V shaped member defined by a pair of first member arcs joined at a first end of each first member arc to form a first vertex; and a second about V shaped member defined by a pair of second member arcs joined at a first end of each second member arc to form a second vertex and a pair of substantially flat trailing sections on either side of an opposite end of each second member arc, and an opposite end of each first member arc joined to an end of each of said pair of substantially flat trailing sections.

19. The deformable device of claim 18, wherein at least one of said pair of substantially flat trailing sections on either side of an opposite end of each second member arc continues past a joined section and curves towards a direction about perpendicular to an axis of said pair of substantially flat trailing sections.

20. The deformable device of claim 18, wherein at least one of said pair of first member arcs continues past a joined section at said first vertex and curves outward towards a direction about parallel to an axis of said pair of substantially flat trailing sections.

* * * * *